United States Patent
Sample

(10) Patent No.: US 10,223,850 B2
(45) Date of Patent: *Mar. 5, 2019

(54) HIGH-Q AND OVER-COUPLED NEAR-FIELD RFID READER ANTENNA FOR IMPROVED TAG READ RANGE

(71) Applicant: DISNEY ENTERPRISES, INC., Burbank, CA (US)

(72) Inventor: Alanson Sample, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/586,220

(22) Filed: May 3, 2017

(65) Prior Publication Data
US 2017/0323501 A1 Nov. 9, 2017

Related U.S. Application Data

(63) Continuation-in-part of application No. 14/929,320, filed on Oct. 31, 2015.

(51) Int. Cl.
*G06K 7/10* (2006.01)
*G07C 9/00* (2006.01)
(Continued)

(52) U.S. Cl.
CPC ...... *G07C 9/00111* (2013.01); *G06K 7/10148* (2013.01); *G06K 7/10366* (2013.01);
(Continued)

(58) Field of Classification Search
CPC .......... G01N 33/5088; G01N 33/5091; G01N 33/57407; G06K 7/10366;
(Continued)

(56) References Cited

U.S. PATENT DOCUMENTS

| 7,894,770 B2 * | 2/2011 | Washiro | H04B 5/00 343/745 |
| 8,410,962 B2 * | 4/2013 | Shibata | H03H 11/1204 327/336 |

(Continued)

OTHER PUBLICATIONS

Sample, et al, "Analysis, Experimental Results, and Range Adaptation of Magnetically Coupled Resonators for Wireless Power Transfer," 2010 IEEE.
(Continued)

*Primary Examiner* — Nam V Nguyen
(74) *Attorney, Agent, or Firm* — Robert G. Crouch; Marsh Fischmann & Breyfogle LLP

(57) ABSTRACT

An RFID system in which at least one of the RFID tag antenna and the RFID reader antenna has an impedance matching network associated therewith in order to better match the impedances of the two antennas. This impedance matching places the antennas into an over-coupled regime once they are within a reasonable distance of each other (e.g., 2 to 50 mm). It also increases the Q-factor of the improved antenna, which can greatly increase the range at which the RFID reader can read the RFID tag. This improved RFID system may be used in any of a variety of application, including operating a door lock mechanism.

11 Claims, 19 Drawing Sheets

(51) Int. Cl.
 H04B 5/00 (2006.01)
 G06K 19/07 (2006.01)
 G06K 19/077 (2006.01)
(52) U.S. Cl.
 CPC ..... G06K 7/10415 (2013.01); G06K 19/0723 (2013.01); G06K 19/07762 (2013.01); G07C 9/00309 (2013.01); *G07C 9/00904* (2013.01); *G07C 2009/00793* (2013.01); *H04B 5/0031* (2013.01)
(58) Field of Classification Search
 CPC ...... G07C 2009/00793; G07C 9/00111; G07C 9/00904; C12Q 1/6886; C12Q 2600/106; C12Q 2600/112; C12Q 2600/118
 USPC ........................................................ 340/5.61
 See application file for complete search history.

(56) References Cited

U.S. PATENT DOCUMENTS

| | | | | |
|---|---|---|---|---|
| 9,653,770 | B2* | 5/2017 | Henry | H04B 7/15557 |
| 9,737,954 | B2* | 8/2017 | Hoffa | B23K 10/006 |
| 9,998,176 | B2* | 6/2018 | Ravani | G06K 19/0727 |
| 2007/0175654 | A1* | 8/2007 | Keith | H04Q 1/06 |
| | | | | 174/135 |
| 2008/0088449 | A1* | 4/2008 | Tran | G06K 7/10336 |
| | | | | 340/572.1 |
| 2008/0150325 | A1* | 6/2008 | Seidel | B62D 33/0617 |
| | | | | 296/190.11 |
| 2008/0231421 | A1* | 9/2008 | Tuttle | G06K 19/07749 |
| | | | | 340/10.1 |
| 2009/0001930 | A1* | 1/2009 | Pohjonen | H01Q 1/2225 |
| | | | | 320/108 |
| 2010/0126071 | A1* | 5/2010 | Hill | E06B 7/32 |
| | | | | 49/70 |
| 2011/0140853 | A1* | 6/2011 | Jung | G06K 7/10217 |
| | | | | 340/10.1 |
| 2012/0161696 | A1* | 6/2012 | Cook | B60L 11/182 |
| | | | | 320/108 |
| 2013/0049934 | A1* | 2/2013 | Baym | G06K 19/02 |
| | | | | 340/10.1 |
| 2013/0207848 | A1* | 8/2013 | Epp | B32B 15/04 |
| | | | | 343/700 MS |
| 2013/0292471 | A1* | 11/2013 | Brasher | G06K 7/10316 |
| | | | | 235/439 |
| 2013/0293430 | A1* | 11/2013 | Henty | H01F 38/14 |
| | | | | 343/720 |
| 2014/0035728 | A1* | 2/2014 | Lee | G06K 7/10198 |
| | | | | 340/10.1 |
| 2014/0320264 | A1* | 10/2014 | Schwarzmueller | |
| | | | | G06K 7/10316 |
| | | | | 340/10.1 |
| 2015/0303997 | A1* | 10/2015 | Dhayni | G06K 7/10128 |
| | | | | 340/10.1 |
| 2015/0379791 | A1 | 12/2015 | Russell et al. | |
| 2016/0221108 | A1* | 8/2016 | Hoffa | B23K 10/006 |
| 2017/0124790 | A1* | 5/2017 | Sample | G07C 9/00111 |
| 2017/0323501 | A1* | 11/2017 | Sample | G07C 9/00111 |

OTHER PUBLICATIONS

Brown, W., "The History of Power Transmission by Radio Waves," Microwave Theory and Techniques, IEEE Transactions on, vol. 32, No. 9, pp. 1230-1242, Sep. 1984.
Sample, A., et al, "Experimental Results with Two Wireless Power Transfer Systems," in Radio and Wireless Symposium, 2009, RWS '09, IEEE, Jan. 2009, pp. 16-18.
PowerMat Inc., http://www.powermat.com, Nov. 2009.
Karalis, A., et al, "Efficient Wireless Non-Radiative Mid-Range Energy Transfer," Annals of Physics, vol. 323, No. 1, pp. 34-48, Jan. 2008 Special Issue 2008, http://sciencedirect.com/science/article/B6WB1-4NKJ0J9-1/2/a898006221e6436e8d84aaf3837d00a6.
Kurs, A., et al, "Wireless Power Transfer via Strongly Coupled Magnetic Resonances," Science, vol. 317, No. 5834, pp. 83-86, 2007, http://www.sciencemag.org/cgi/content/abstract/317/5834/83.
Cannon, B., et al, "Magnetic Resonant Coupling as a Potential Means for Wireless Power Transfer to Multiple Small Receivers," Power Electronics, IEEE Transactions, vol. 24, No. 7, pp. 1819-1825, Jul. 2009.
Low, Z.N., et al, "Design and Test of a High Power High-Efficiency Loosely Coupled Planar Wireless Power Transfer System," Industrial Electronics, IEEE Transactions, vol. 56, No. 5, pp. 1801-1812, May 2009.
Casanova, J., et al, "A Loosely Coupled Planar Wireless Power System for Multiple Receivers," Industrial Electronics, IEEE Transactions, vol. 56, No. 8, pp. 3060-3068, Aug. 2009.
Kim, Y.H., et al, "Optimization of Wireless Power Transmission Through Resonant Coupling," Compatibility and Power Electronics, 2009, CPE '09, May 2009, pp. 426-431.
Woodruff, A., et al, "Portable, but not Mobile: A Study of Wireless Laptops in the Home," Proc. Pervasive, pp. 216-233, May 2007.
Fletcher, N., et al, "The Physics of Musical Instruments," Springer-Verlag, 1998.
Mongia, R., et al, "RF and Microwave Coupled-Line Circuits," City: Artech House Publishers, 2007.
Kajfez, D., et al, "Q-Factor Measurement with Network Analyzer," Microwave Theory and Techniques, IEEE Transactions, vol. 32, No. 7, pp. 666-670, Jul. 1984.
Chan, H., et al, "A Simplified Neumann's Formula for Calculation of Inductance of Spiral Coil," Power Electronics and Variable Speed Drives, 2000, 8th International Conference, IEEE Conf. Publ. No. 475, pp. 69-73.

* cited by examiner

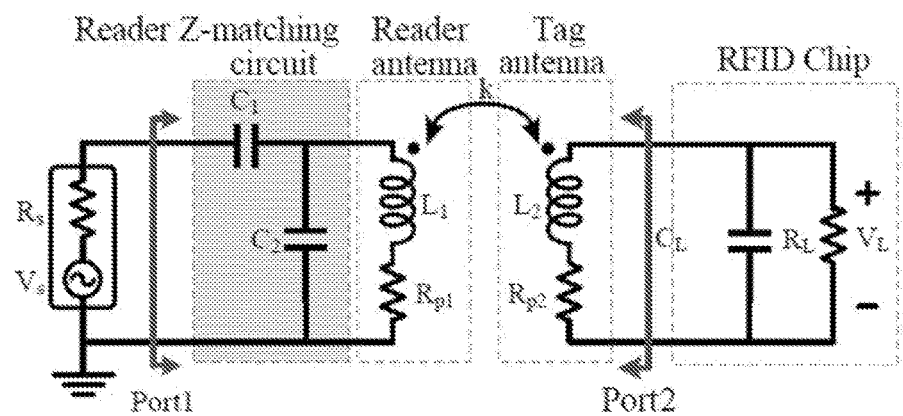
FIG. 10
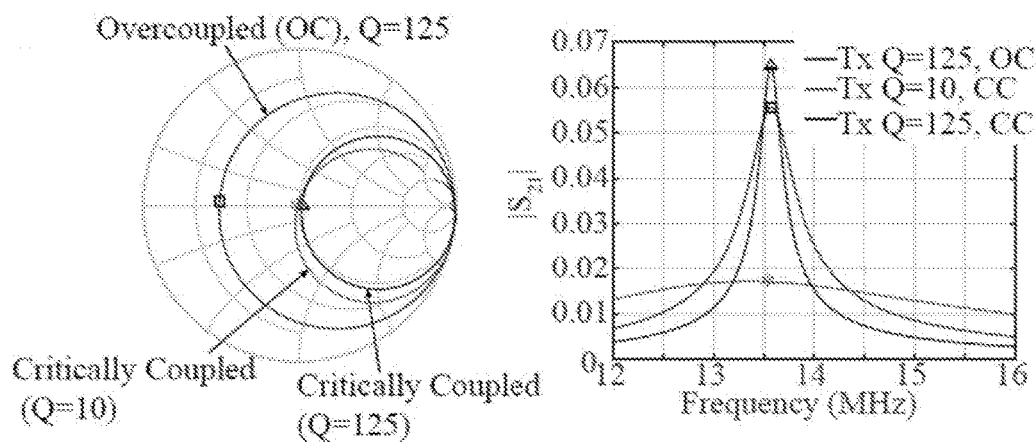
FIG. 11(a)
FIG. 11(b)

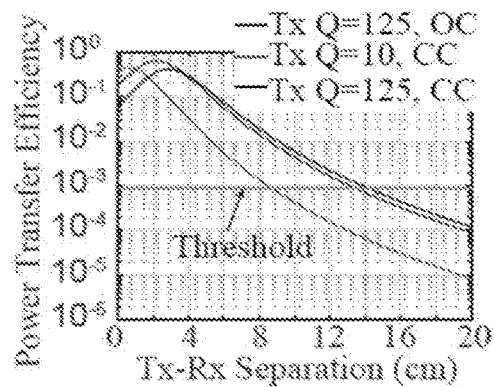
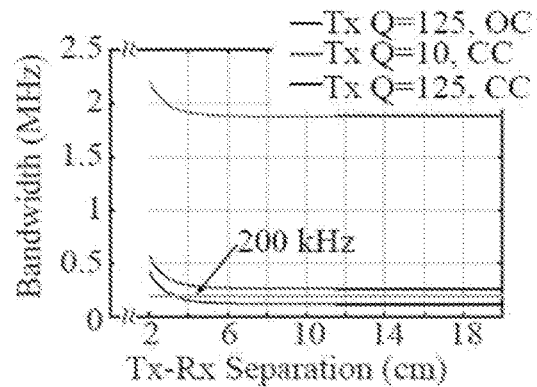
FIG. 12(a)  FIG. 12(b)
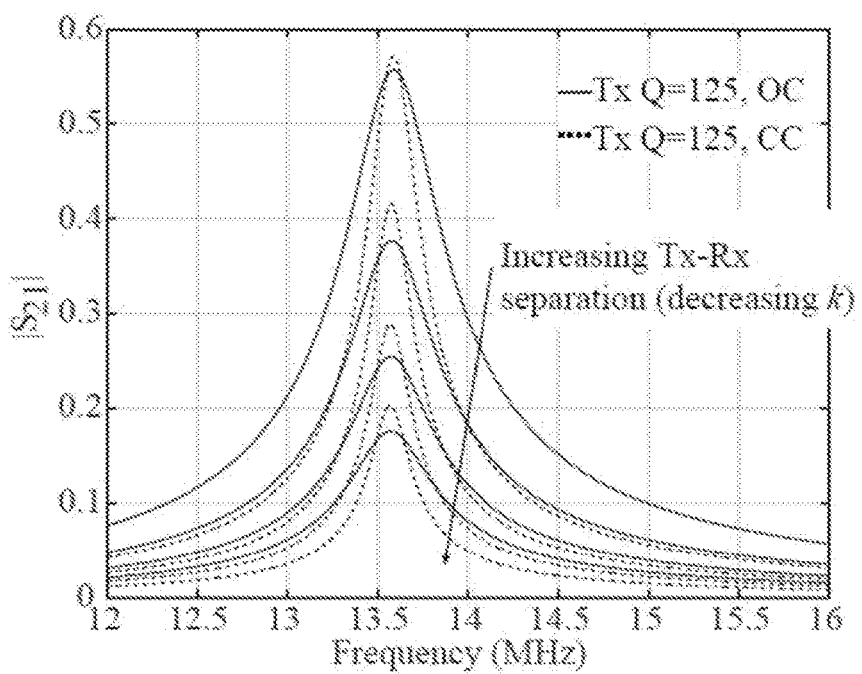
FIG. 13

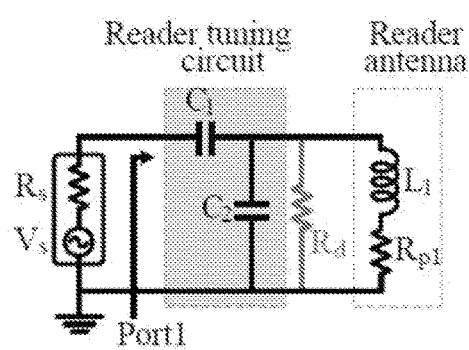
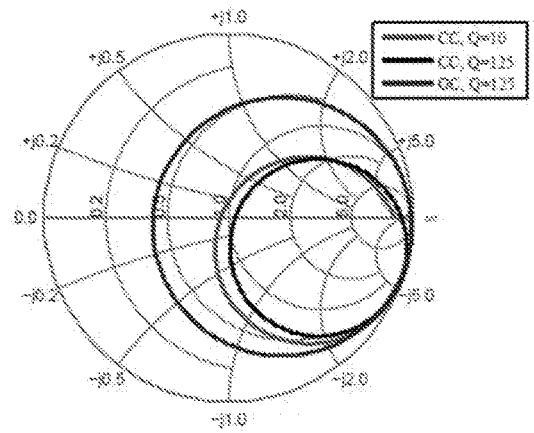
FIG. 20(a)　　　　　　　　　　　FIG. 20(b)
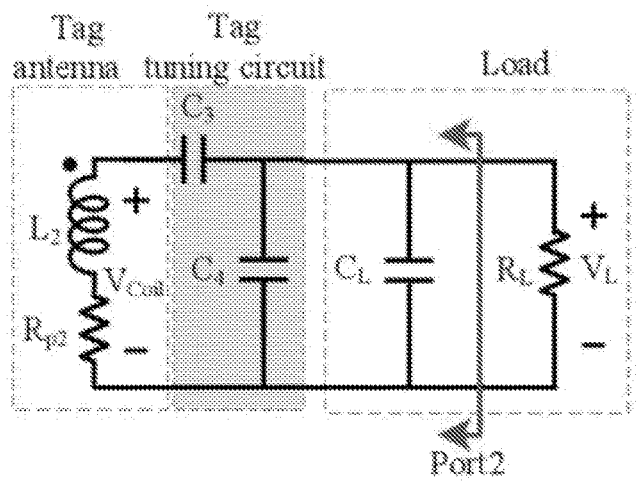
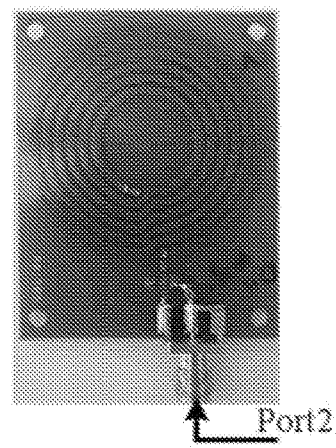
FIG. 21(a)　　　　　　　　　　　FIG. 21(b)

HIGH-Q AND OVER-COUPLED NEAR-FIELD RFID READER ANTENNA FOR IMPROVED TAG READ RANGE

CROSS-REFERENCE TO RELATED APPLICATIONS

This application is a Continuation-in-Part of and claims the benefit from U.S. application Ser. No. 14/929,320, filed on Oct. 31, 2015, now U.S. Pat. No. 10,102,697. The contents of all of the aforementioned applications and patents are incorporated by reference herein in their entireties.

BACKGROUND

The use of RFID (Radio Frequency Identification) technology is very common in the modern day world. One specific such use is in door lock mechanisms (such as for individual hotel rooms), in which case the door lock may include an RFID reader to detect the proximity of a device worn or held by a hotel guest and unlock the door. Problems with unlocking doors can occur due to challenging ergonomics related to door jams and door handles, due to the short read range of the RFID reader, and/or due to less than optimal performance by the RFID reader. It is desirable to increase the success rate of unlocking doors when hotel guests have their device within a reasonable proximity of the door lock mechanism.

Many forms of RFID make use of electromagnetic induction between a pair of coils (loop antennas), one typically located in an RFID reader and one typically located in an RFID tag. One class of RFID technology is known as Near Field Communication (NFC) in which a pair of devices establish radio communication when they are brought to within a certain minimum distance of each other (e.g., 10 cm or less). NFC devices may typically operate at an RF frequency of 13.56 MHz. Other RFID frequencies may be in the range of 125 kHz, 433 MHz, 866.5 MHz, 915 MHz, and in the microwave frequencies, to name a few.

One parameter of an antenna and associated circuit is known as a quality-factor (or Q-factor). It is a dimensionless quantity that describes how under-damped an oscillator or resonator is, in addition to characterizing a resonator's bandwidth relative to its center frequency. Higher Q indicates a lower rate of energy loss relative to the stored energy of the resonator; the oscillations die out more slowly. A pendulum suspended from a high-quality bearing, oscillating in air, has a high Q, while a pendulum immersed in oil has a low one. Resonators with high quality factors have low damping so that they ring longer. With antennas and their associated circuits, a high Q-factor means the antenna and circuit will resonate longer than if they had a lower Q-factor.

It is against this background that the techniques described herein have been developed.

SUMMARY

Disclosed herein is an RFID system which includes a tag including an antenna that selectively transfers a data signal; and a reader including an antenna that receives the data signal from the tag. At least one of the tag antenna and the reader antenna have a Q-factor that is greater than 30. The tag antenna and the reader antenna are sufficiently matched in impedance to place the two antennas into an over-coupled regime.

The tag may be worn by a user. The tag may be attached to a wristband worn by a user. The reader may be attached to a door having a door lock mechanism and provide an unlock signal to the door lock mechanism. The tag may be attached to a wristband worn by a user and the reader attached to a door having a door lock mechanism and provide an unlock signal to the door lock mechanism. The door may include a generally planar door surface and a door latch actuator that pivots about a pivot axis, the door latch actuator including an elongated handle portion defining a handle axis that extends generally transversely from the pivot axis and generally parallel to the planar door surface, the reader being located in relation to the planar door surface in a position vertically offset from and spaced apart from the handle axis and horizontally offset from and spaced apart from the pivot axis.

The two antennas may be in an over-coupled regime when they are located within 30 mm of each other. The two antennas may be in an over-coupled regime when they are located within 20 mm of each other. The two antennas may be in an over-coupled regime when they are located within 10 mm of each other. The reader antenna may include an impedance matching network associated therewith. The tag antenna may include an impedance matching network associated therewith. The tag antenna may include an impedance matching network associated therewith. The data signal may include a tag identifier. The tag identifier may include an identification number.

Also disclosed is an RFID system which includes a tag including an antenna that selectively transfers a data signal; and a reader including an antenna that receives the data signal from the tag. At least one of the tag antenna and the reader antenna have a Q-factor that is greater than 30. At least one of the tag antenna and the reader antenna include an impedance matching network associated therewith.

Also disclosed is an RFID system which includes a tag including an antenna that selectively transfers a data signal; and a reader including an antenna that receives the data signal from the tag. The tag antenna and the reader antenna are over-coupled when the antennas are within 10 mm of each other.

Also disclosed is an RFID system which includes a tag including an antenna that selectively transfers a data signal, wherein the data signal includes a tag identifier; and a reader including an antenna that receives the data signal from the tag. At least one of the tag antenna and the reader antenna have a Q-factor that is greater than 30. At least one of the tag antenna and the reader antenna include an impedance matching network associated therewith. The tag antenna and the reader antenna are over-coupled when the antennas are within 10 mm of each other.

The tag may be attached to a wristband worn by a user and the reader is attached to a door having a door lock mechanism and provides an unlock signal to the door lock mechanism. The door may include a generally planar door surface and a door latch actuator that pivots about a pivot axis, the door latch actuator including an elongated handle portion defining a handle axis that extends generally transversely from the pivot axis and generally parallel to the planar door surface, the reader being located in relation to the planar door surface in a position vertically offset from and spaced apart from the handle axis and horizontally offset from and spaced apart from the pivot axis.

Also disclosed is an RFID system which includes a reader including an antenna that selectively transfers an electrical signal; and a tag including an antenna that receives the electrical signal from the tag. At least one of the tag antenna and the reader antenna have a Q-factor that is greater than 30. The tag antenna and the reader antenna are sufficiently matched in impedance to place the two antennas into an over-coupled regime.

Also disclosed is an RFID system which includes a tag including an antenna that selectively transfers a data signal, wherein the tag is carried by a wristband adapted to be worn by a user; and a reader including an antenna that receives the data signal from the tag, wherein the reader is carried by a door. The door includes a generally planar door surface and a door latch actuator that pivots about a pivot axis, the door latch actuator including an elongated handle portion defining a handle axis that extends generally transversely from the pivot axis and generally parallel to the planar door surface, the reader being located in relation to the planar door surface in a position vertically offset from and spaced apart from the handle axis and horizontally offset from and spaced apart from the pivot axis.

BRIEF DESCRIPTION OF THE DRAWINGS

FIG. 10 is a circuit schematic showing tuning circuit for reader and tag antennas and also the RFID chip lumped model FIG. 11($a$) is a Smith chart illustrating impedance variation over frequency for OC and CC resonators, with high and low Q values. FIG. 11($b$) shows a graph of the magnitude of the transmission coefficient, $S_{21}$ corresponding to the impedances plotted in FIG. 11($a$). In this example, the coupling coefficient, k=0:005. The square, asterisk, and triangle indicate the frequency at which f=13.56 MHz on each curve for the Q=125 OC, Q=10 CC, and Q=125 CC cases, respectively.

FIG. 12($a$) shows the power transfer efficiency for the circuit of FIG. 10 as the distance between transmitter and receiver is varied for an OC transmitter with Q=125, a CC transmitter with Q=10, and a CC transmitter with Q=125. FIG. 12($b$) shows bandwidth versus reader to tag coil separation for same Q and OC/CC combinations of FIG. 12($a$).

FIG. 13 shows the absolute value of $S_{21}$, between the transmitter and load (RFID chip), for varied separations between transmitter and receiver from 3.8 to 6.8 cm. Note that, due to overcoupling, the resonance of the OC case is damped compared to the CC case, yielding a desirably larger bandwidth.

FIG. 18($b$) shows the value of $g_{min}$ for certain values of Q-factor of transmitter.

FIG. 20($a$) shows a circuit diagram of the antenna and tuning circuit. FIG. 20($b$) is a Smith chart showing the measured $S_{11}$ for 3 design cases considered in this work: CC, Q=10; CC, Q=125; and OC, Q=125.

FIG. 21($a$) shows the circuit diagram of the receiver side. FIG. 21($b$) shows an image of the receiver antenna and tuning circuit (the chip is soldered to an SMA connector to be attached to antenna)

DETAILED DESCRIPTION

Figure 1:
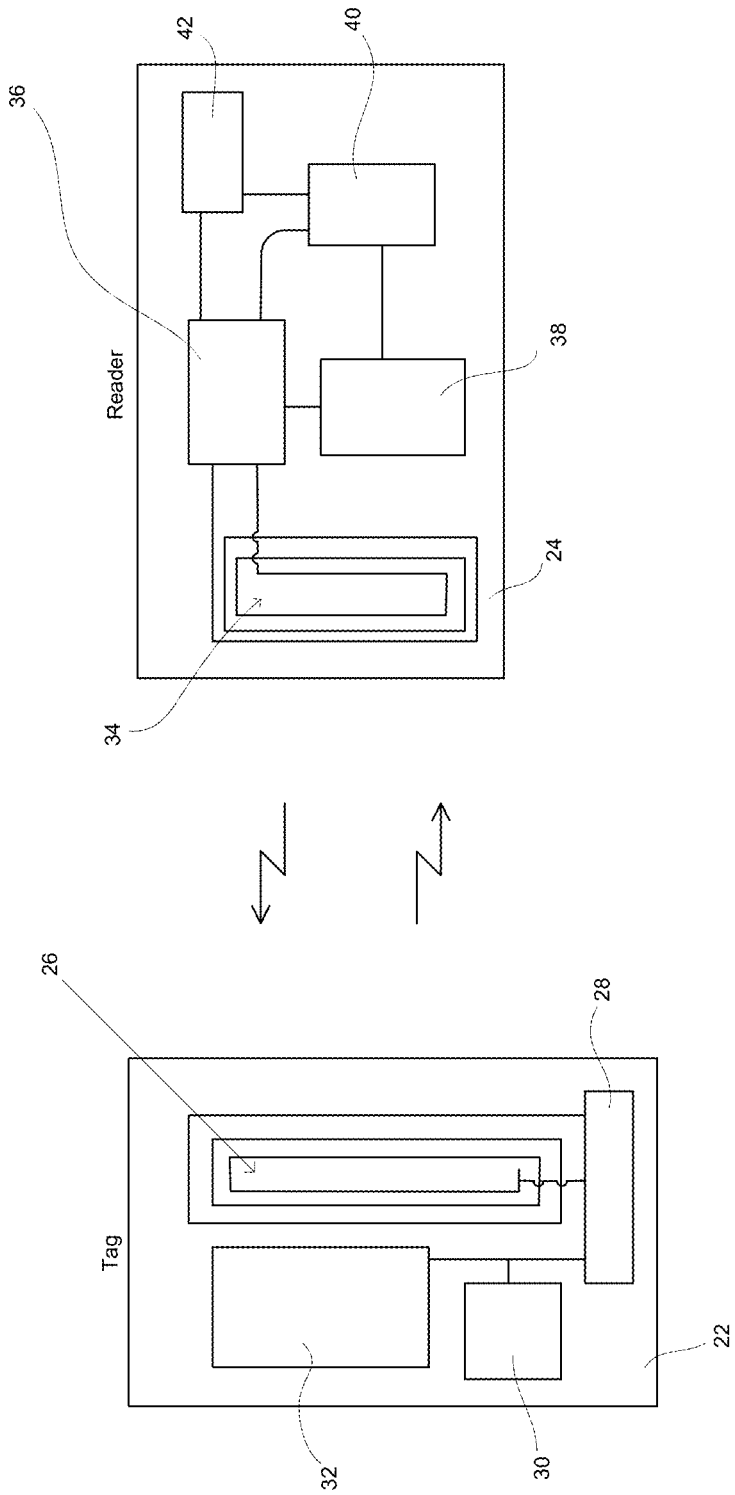
FIG. 1 is a block diagram of an RFID system.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

As part of addressing the problems described in the background above, it has been recognized that current RFID NFC system designs are all of an "under-coupled nature." Under-coupling (also known as "loosely coupled") and over-coupling refer to the degree of inductive coupling between two different resonant circuits. In the present case, one of the resonant circuits is the coil or antenna in an RFID tag. The other resonant circuit is the coil or antenna in the RFID reader. The mutual inductance (M) of a pair of resonant circuits is equal to the coupling coefficient (k) times the square-root of the product of the inductance of the first coil and the inductance of the second coil (M=k $(L_1L_2)^{0.5}$), where k falls within a range from 0 to 1.

In a highly under-coupled scenario, the bandwidth will be narrow. As the mutual inductance increases (becoming less under-coupled), the bandwidth continues to grow. Eventually, the coupling coefficient reaches a critical point, at which the power spikes and the bandwidth drops sharply. Beyond this null at the critical point, the bandwidth increases further, but the center frequency of the response is no longer the peak and there become a pair of peaks, one on either side of the center frequency. This region (beyond the critical point) is referred to as the over-coupling region or regime. Basically, when over-coupled, the receiving antenna receives more magnetic flux than is needed to support the load associated with the receiving antenna.

In order to avoid issues in reading RFID tags at the null (critical point), RFID NFC systems to date have been purposely designed to remain in the under-coupled region. This is done, in part, by decreasing the quality factor (Q-factor) of the transmit antenna (the tag) in order to increase the bandwidth. This can include keeping the Q-factor in the range of 10 to 20. Unfortunately, in an under-coupled scenario with a Q-factor in this range, the read range of the RFID reader drops off sharply. In such scenarios, the performance of devices such as door lock mechanisms can be unreliable and ultimately frustrating to hotel guests.

Another issue has to do with the need for the RFID reader to provide sufficient power to the passive RFID tag so that the tag can send a signal back to the RFID reader. In under-coupled systems, it can be important for the size of the antenna in the tag to match the size of the antenna in the reader. Unfortunately, various applications may require a reader to be able to power and read tags of different sizes. In order to address this issue, non-optimal solutions have included nesting a smaller antenna inside of a larger antenna.

Further, high-Q resonators that are inductively coupled can efficiently transfer energy to one another if the inductive link between them is low in loss. Accordingly, to increase the operating range of a near-field tag, it can be desirable to use very high Q resonators.

Partially in reaction to all of the above, a system has been developed where the RFID reader and the RFID tag are intentionally designed to be over-coupled. It is believed that RFID systems with over-coupled designs are novel. This can be accomplished by improving the impedance matching between the tag antenna and the reader antenna. Further, in the over-coupled setting, there is no need to intentionally limit the Q-factor of the antenna, so read range can be increased. Further, with an over-coupled design, the effective bandwidth is increased by the dual-peak response. In addition, although the dual-peak response does somewhat decrease the power transfer efficiency, this effect is not very significant since the tag is sufficiently close to the reader to provide sufficient power, despite being less efficient.

Further, the RFID system related to operating a door lock mechanism has been improved by locating the reader in a physical position on the door that is offset from the normal door lock/key mechanism location. Since the RFID tag may be worn on the wrist of the user, the RFID reader has been moved to a physical position on the door that is in the region close to where the wrist of the user will be when the user attempts to use the door handle.

FIG. 1 shows a simplified RFID system 20 that includes an RFID tag 22 and an RFID reader 24. The tag 22 includes an antenna 26 or coil (which coil may include an appropriate number of turns). The two opposite ends of the antenna 26 are connected to an impedance matching network 28 (which will be described in greater detail below). The impedance matching network 28 is also connected to an RFID integrated circuit (IC) 30 which provides the functionality described below. The network 28 and IC 30 may also be connected to an energy device 32. The energy device 32 may include a battery and/or another type of energy storage device (e.g., a capacitor) which can store energy received from the antenna 26 and network 28.

As mentioned, the tag 22 may be a passive device (no onboard power source), a battery-assisted passive device (e.g., the tag includes a battery but only activates in the presence of an RFID reader), or an active device. Shown herein are tags that are passive devices. Further, in the case of passive tags, the RFID reader 24 may send out an interrogation signal from which the RFID tag 22 obtains power and responds with a response signal to be read by the reader 24. This response signal typically has data embedded therein, such as a serial number or tag number. The reader 24 can then determine if this particular tag number is authorized to unlock this particular door.

Figure 2:
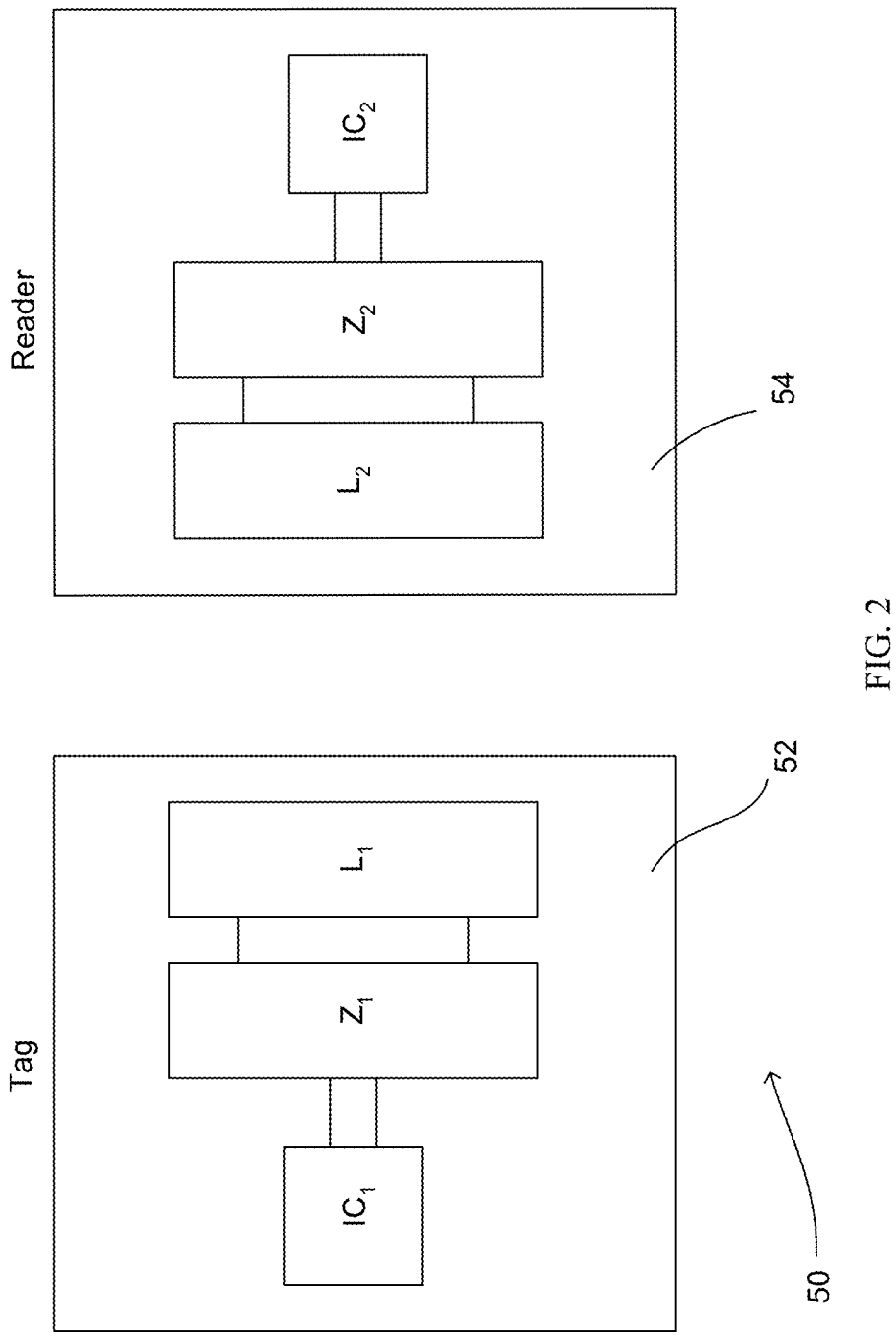
FIG. 2 is a block diagram of a first embodiment of selected components of an RFID system.

FIG. 2 shows an arrangement 50 in which only simplified versions of an RFID tag 52 and RFID reader 54 are shown. This arrangement 50 shows that the tag 52 includes a coil $L_1$, an impedance matching network $Z_1$, and an integrated circuit $IC_1$. Also, the reader 54 includes a coil $L_2$, an impedance matching network $Z_2$, and an integrated circuit $IC_2$.

Figure 3:
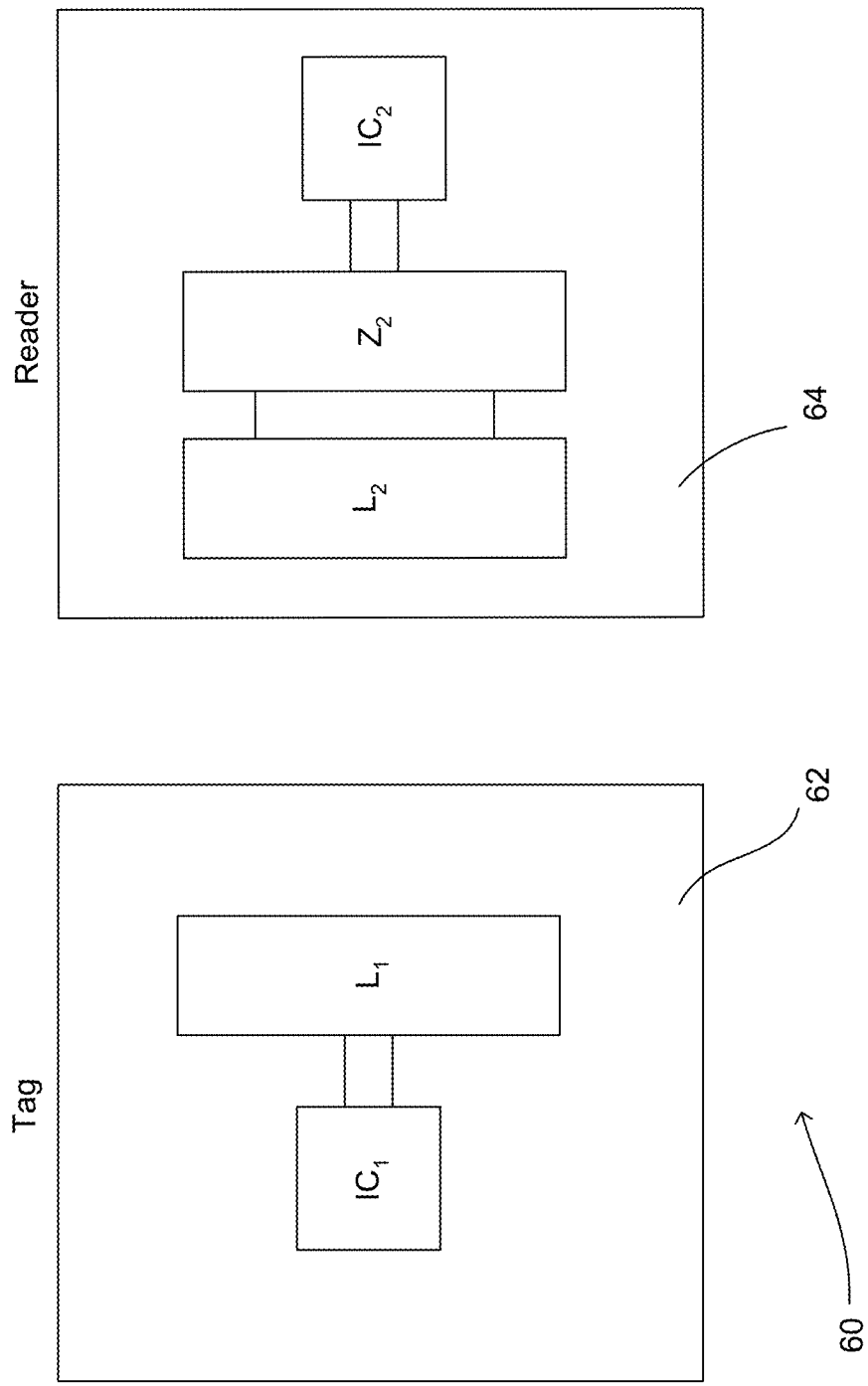
FIG. 3 is a block diagram of a second embodiment of selected components of an RFID system.

FIG. 3 shows an arrangement 60 in which only simplified versions of an RFID tag 62 and RFID reader 64 are shown. This arrangement 60 shows that the tag 62 includes a coil $L_1$ and an integrated circuit $IC_1$. Also, the reader 64 includes a coil $L_2$, an impedance matching network $Z_2$, and an integrated circuit $IC_2$.

Figure 4:
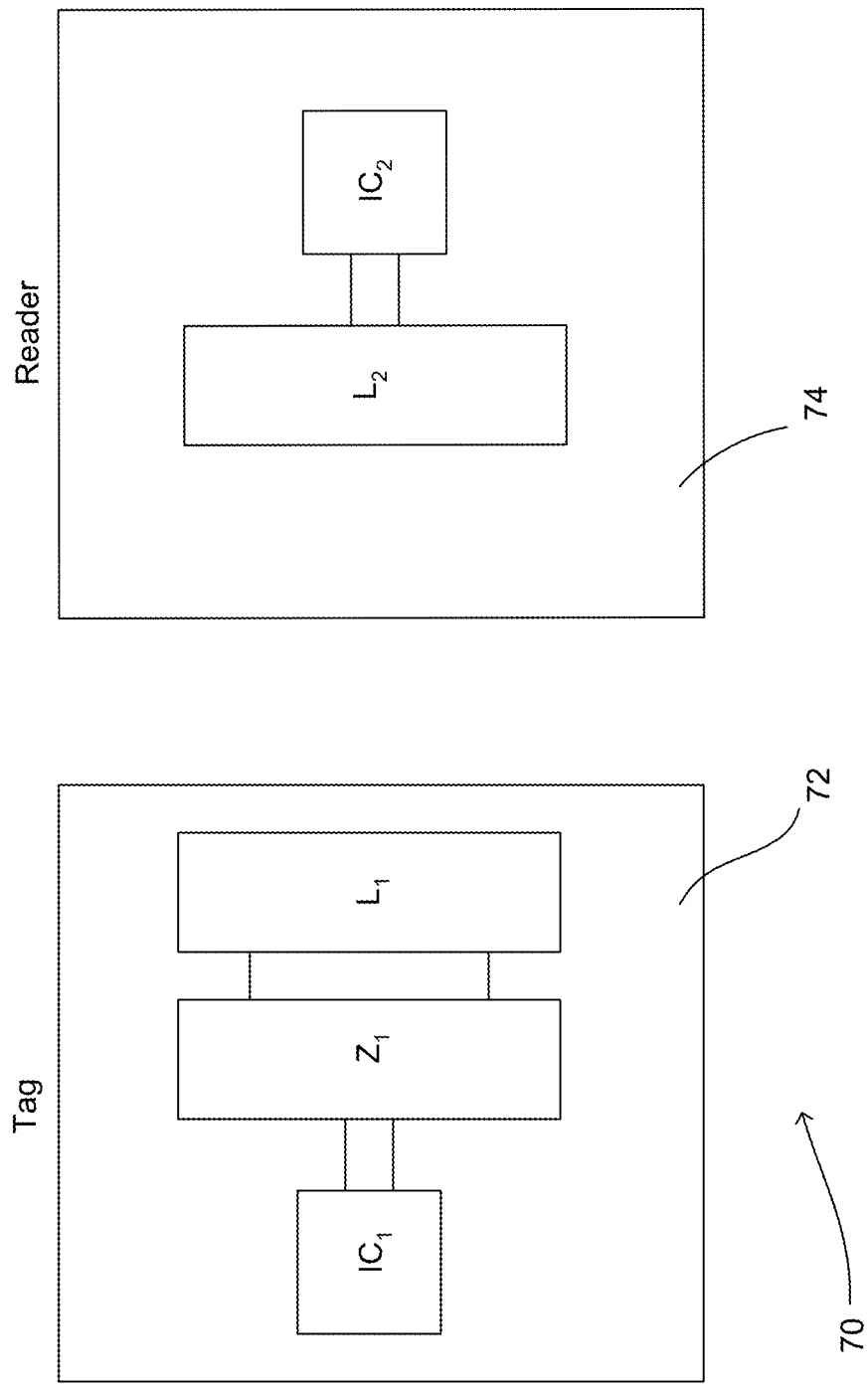
FIG. 4 is a block diagram of a third embodiment of selected components of an RFID system.

FIG. 4 shows an arrangement 70 in which only simplified versions of an RFID tag 72 and RFID reader 74 are shown. This arrangement 70 shows that the tag 72 includes a coil $L_1$, an impedance matching network $Z_1$, and an integrated circuit $IC_1$. Also, the reader 74 includes a coil $L_2$, and an integrated circuit $IC_2$.

As can be seen, these three embodiments (shown in FIGS. 2-4) demonstrate that an improved RFID system could include an impedance matching network in both the tag and the reader, in only the reader, or in only the tag. Relatedly, any combination of the tag and the reader could have a high-Q.

Figure 5:
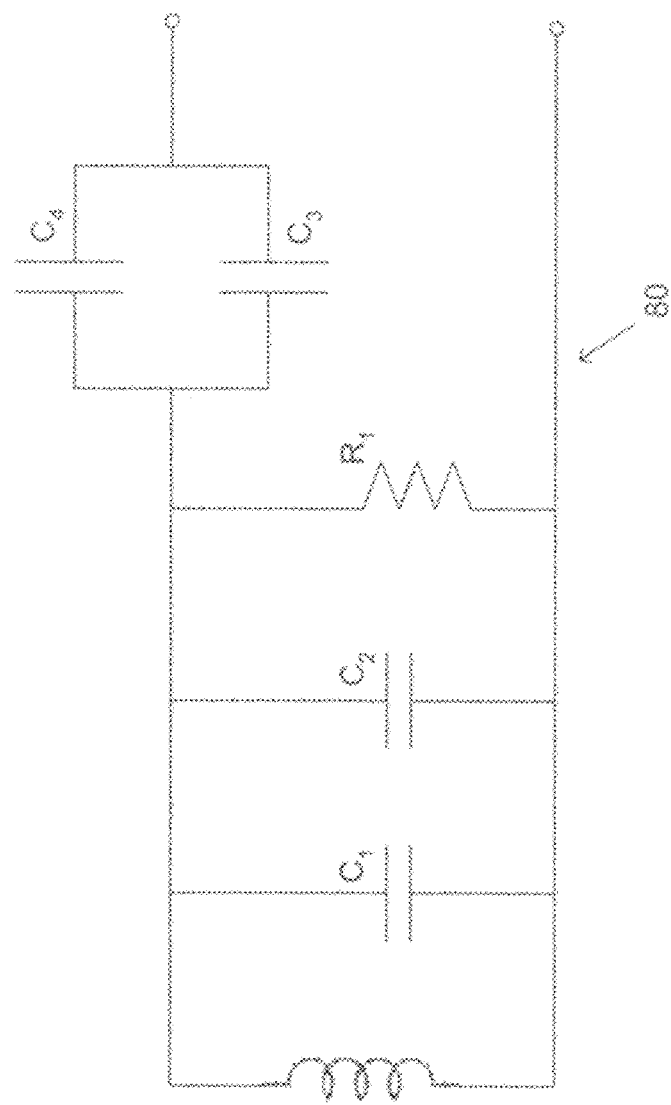
FIG. 5 is a schematic view of an antenna and impedance matching network of an RFID reader of the RFID system of FIG. 1.

FIG. 5 shows a representative schematic of a reader coil and an impedance matching network 80. One example of component values that provides improved impedance matching may be:

$L_1$=~1.66uH (1.1508Ω+141.83 jΩ@13.56 MHz)

$C_1$=3-10 pF Var-Cap $C_2$=83 pF $R_1$=infinite(in other words,Do Not Populate(DNP))

$C_3$=10 pF $C_4$=10 pF

Figure 6:
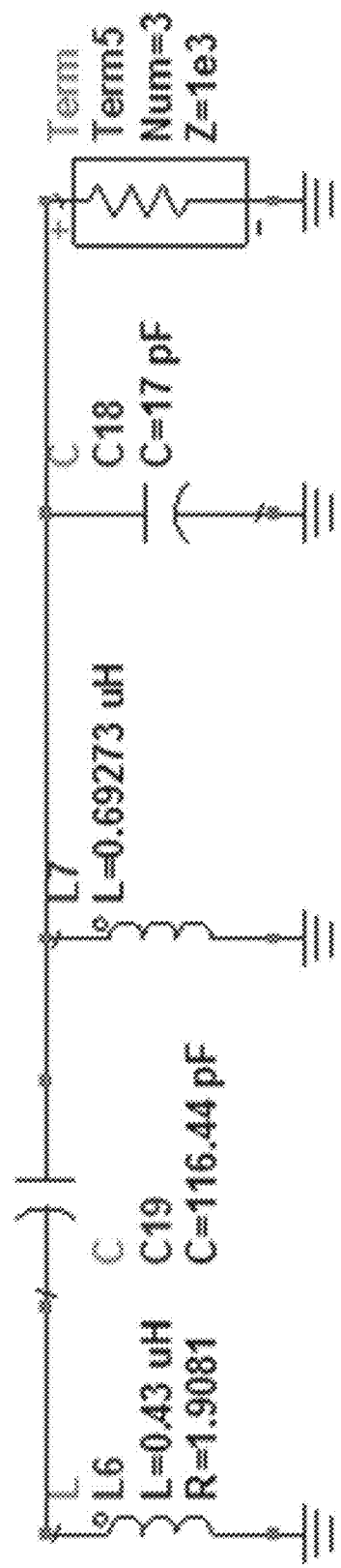
FIG. 6 is schematic view of an antenna and impedance matching network of an RFID tag of the RFID system of FIG. 1.

FIG. 6 shows a representative schematic of a tag coil and an impedance matching network 90. One example of component values that provides improved impedance matching may be:

$L_6$=0.43 μH $C_{19}$=116 pF $L_7$=0.69273 μH $C_{tag}$(C18)=17 pF $R_{tag}$(Term5)=1 k-ohm It should be understood that any other appropriate values for the components in the impedance matching networks could be used. It may be desirable that the overall impedances are better matched than if no such networks were employed. Further, any other type or style of impedance matching network could be used.

Although not discussed in great detail herein, the RFID tag will typically include circuitry (e.g., in an IC) that performs such functions as storing/processing information (e.g., a tag number or serial number), modulating/demodulating outgoing/ingoing signals, and collecting electrical power. Such RFID tag ICs are commonly available off-the-shelf. Similarly, the RFID reader will typically include circuitry (e.g., in an IC) that performs such functions as preparing interrogation signals, modulating/demodulating outgoing/ingoing signals, processing received signals from nearby tags, sending an output signal that may serve as an unlock signal to an associated door lock mechanism, and power-management functions with regard to an associated power source. Such RFID tag and reader ICs are commonly available off-the-shelf from manufacturers such as Texas Instruments, NXP/Philips, ST Microelectronics, and others.

Figure 7:
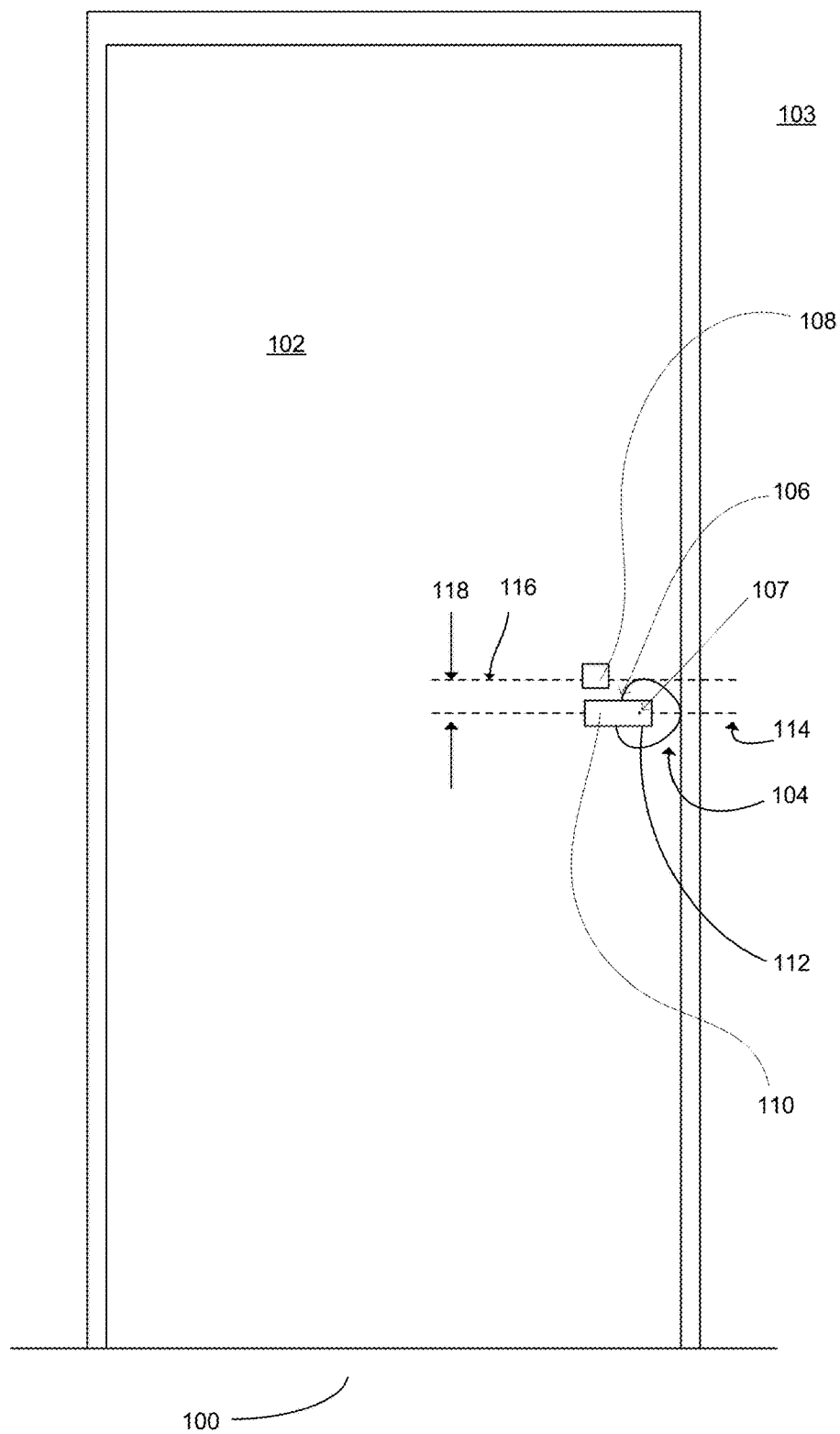
FIG. 7 is a simplified illustration of a door with a door lock and latch mechanism, from a generally horizontally-oriented view.
Figure 8:
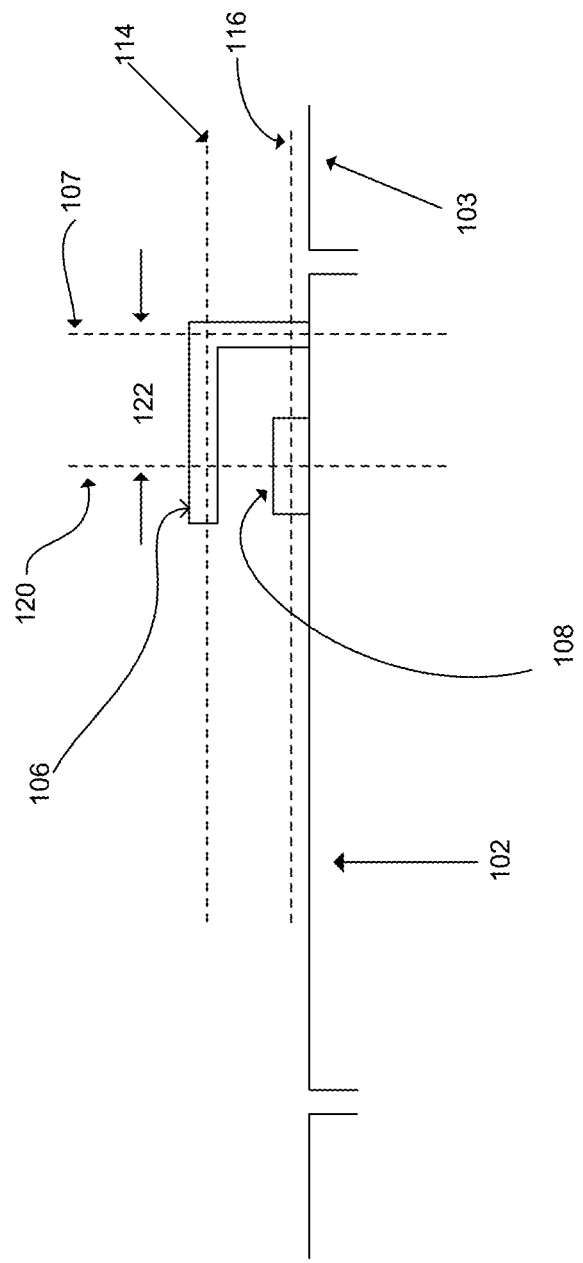
FIG. 8 is a simplified illustration of the door with the door lock and latch mechanism of FIG. 7, from a generally vertically-oriented view.

FIGS. 7 and 8 show an implementation 100 of the teachings herein. A door 102 (e.g., such as to a hotel room) has a door latch mechanism 104 that includes a door actuator or handle 106 that extends transversely from a pivot axis 107 (that extends in and out of the drawing of FIG. 7). In a conventional manner, movement of the door handle 106 in an up or down manner (as shown in FIG. 7), so as to pivot the handle 106 about the pivot axis 107, can actuate or open the door latch so that the door 102 can be opened. All or at least a portion of a door lock actuator mechanism 108 can be positioned on the door 102 vertically above (or below) a first end 110 of the door handle 106 that is offset from the pivot axis 107. A second end 112 of the door handle 106 is aligned with the pivot axis 107. The door handle can be seen to have a longitudinal axis 114 that is transverse to or generally orthogonal to the pivot axis 107. A parallel axis 116 through the door lock mechanism 108 can be seen to be offset by an amount 118 from the handle axis 114. The portion of the door lock actuator mechanism 108 that is vertically-aligned with the first end 112 of the door handle 106 includes the antenna or coil of the RFID reader. The portion of the door lock actuator mechanism 108 has a central axis 120 passing therethrough and it is horizontally-offset from the pivot axis 107 by an amount 122. In this manner, it can be appreciated that a user wearing a wristband containing the RFID tag on their left hand (for example) would be likely to grasp the door handle 106 in a manner so that their wrist is generally aligned with the door lock actuator mechanism 108. Thus, the RFID tag and reader will be fairly close to each other so that the RFID reader can read the RFID tag and actuate the door lock mechanism so as to unlock the door. For example, the RFID tag and reader might be located within 10 to 40 mm of each other in such case.

Figure 9:
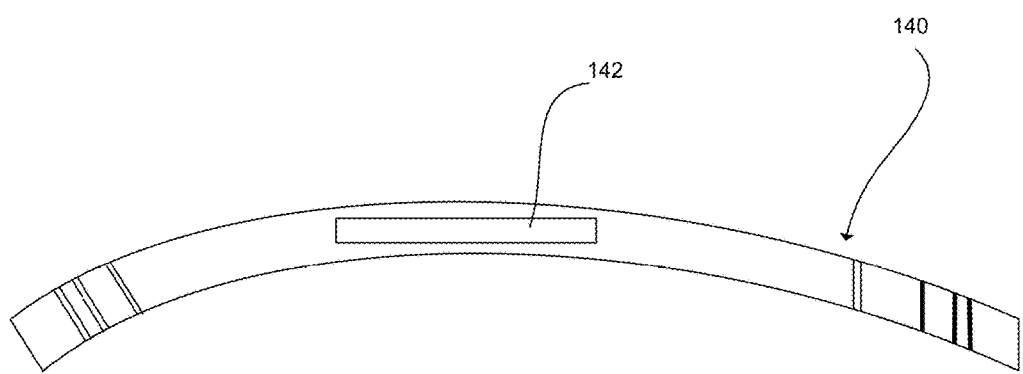
FIG. 9 is a simplified illustration of a wristband worn by a user, the wristband containing an RFID tag.

FIG. 9 shows a simplified illustration of a wristband 140 worn by a user. The wristband 140 may contain an RFID tag 142 (similar to RFID tag 22).

In the case of the door lock application where the RFID reader is associated with the door and door lock mechanism and the RFID tag is worn or carried by a user (e.g., a hotel guest), the improved techniques taught herein greatly improve the user's ability to easily unlock their hotel room door. It has been found (via both simulation results and actual measurements) that by designing a system that operates in the over-coupled regime, the use of high-Q coils is enabled (Q-factors of greater than 20, of at least 30, and of up to and greater than 100), which increases the read range without sacrificing communication bandwidth. Further, the techniques taught herein can improve the read range from less than 2 mm to in the range of 30 mm or greater. For example, the system may be in the over-coupled regime when the loops are within 10 mm of each other, resulting in successful door lock operation. This may also true at up to 20 mm of spacing between the antennas, at up to 30 mm of spacing between the antennas, and at up to and in excess of 40 mm of spacing between the antennas.

For a given size, geometry, and orientation of the tag and reader coils, the critical coupling point can be expressed as a distance. It has been found experimentally that the location (or range) in space where the (previously-described) null occurs is so narrow (e.g., 1 mm in width) that tag/reader/door lock operation is not disrupted.

In addition, the large amount of power captured by the RFID tag from the RFID reader when in the over-coupled region has been found to be sufficient to power the RFID tag, and such approaches as nested antennas are not necessary.

The following discussion covers much of the same ground with the same or similar details and with some additional details. Reference can be had to the conference paper "High-Q, Over-Coupled Tuning for Near-Field RFID Systems," by M. Shahmohammadi, M. Chabalko, and A. Sample, *IEEE International Conference on RFID*, May 3-5, 2016, the entire contents of which are incorporated herein by reference. One of the key advantages of magnetic coupled resonance is that, given proper tuning techniques, it is possible to achieve near constant power transfer efficiency as a function of distance and orientation for transmitter to receiver separation up to approximately one coil diameter. This increase in performance is largely due to the fact that these high-Q systems operate in the over-coupled regime, meaning that the two inductive coils share more magnetic flux than is needed to support the load. This results in frequency splitting and multiple modes of operation.

Since many wireless power systems based on magnetic coupled resonance operate on the same physical layer as near-field RFID (i.e. the 13.56 MHz ISM band) there is the opportunity to apply these techniques to RFID reader and tag coil designs; thereby increasing read range, ease of use, and overall system reliability. However, near-field RFID antenna designers face an inherent tradeoff between increasing coil quality factor (to improve range) verses maintaining the bandwidth needed for communication. Conventional wisdom from industry states that tag and reader coils should have a Quality factor no greater than 10 or 20 in order to have enough bandwidth for communication.

While traditional techniques focus on ensuring there is a conjugate impedance match between the RFID reader and antenna in order to maximize power transfer (i.e. ensuring that they are critically coupled). This disclosure draws upon the lessons learned from the wireless power community and employs a novel tuning method based on over-coupling the RFID reader to the coil. This method allows the antenna designer to simultaneously increase the coil quality factor (>125) while maintaining the bandwidth necessary for communication, thus resulting in longer read ranges.

Background information is provided that shows how increasing the coil quality factor can increase the range at which an RFID tag can be powered and also describes the effect of increased Q on bandwidth. Then there is a discussion of how this bandwidth limitation can be overcome via over-coupled tuning. In addition, a mathematical model is presented that shows how to optimize the systems read range as a function of both reader coil Q factor and over-coupling ratio. Then, measured results are provided showing that a Texas Instruments TRF7970A RFID reader development board can be modified to improve the read range of commercial stock RFID tags by 19% to 77%, simply by changing the impedance matching network such that the antenna is over-coupled and its Q is 125. While the primary focus of this discussion is on improving the reader range by modifying the reader coil; a later portion presents measured results showing the improvements that can be achieved by applying the high-Q and over-coupled tuning techniques to both the reader and tag coils.

Now, there will be a discussion of how the read range of near field RFID systems can be increased using coils with high Q-factors. Conventional near field RFID designs will be discussed first, with a focus on how traditional systems are impedance matched for maximal read range. Then, an alternative impedance matched strategy using over-coupling (OC) on the reader side will be introduced that shows how high Q coils used in this regime can simultaneously allow for greater wireless power transfer to the tag, while maintaining sufficient bandwidth for communication. Taken together these two elements ultimately yield extended read range.

The circuit model for a typical near field RFID system, and the one to be analyzed throughout this section is shown in FIG. 10. It is a pair of coupled coils with transmitter (Port 1, reader) inductance and self-resistance, $L_1$ and $R_1$, respectively, and a receiver (Port 2, tag) inductance and self resistance of $L_2$ and $R_2$. Their coupling is captured through the coupling coefficient, k, where k is related to the mutual inductance, M, of the coils by $M=k(L_1 L_2)^{0.5}$. The transmitter has a source resistance of $R_s$=50. The capacitors $C_1$, $C_2$, are used in impedance matching the source to the network input. On the tag (load) side, resonance results from the parallel combination of the parasitic capacitance of the chip, $C_L$, and the RFID coil inductor, $L_2$.

In near field RFID, to maximize read range, a major concern is ensuring that enough power reaches the RFID chip for operation. It is well known in the WPT and circuit communities that maximum power transfer is achieved between the source and the load by ensuring a conjugate match is achieved on the transmitter (and optimally also receiver) end(s) of the system. This statement is likewise true in near-field HF RFID applications.

Thus, in a standard near field RFID system, the approach is to match the input impedance of the reader coil (as seen at Port 1), to the source impedance, $R_s$, when is isolated from the tag. This is known as critical coupling (CC) which maximizes the amount of the power leaving the reader. When the tag coil is brought from very far away, closer and closer to the reader coil, k goes from effectively 0 (completely decoupled) to very small values (e.g. k=0:005). FIG. 11(a) shows a plot of the system input impedance for two CC coils (red and black curves) when k=0:005. Note that for small k the red and black curves meet the center of the smith chart, indicating that they are impedance matched to the source and minimal power is lost to input reflections.

Since small k represents distances at which the reader coil and tag coil are farthest apart, the result is that, for the CC regime, the system is optimized for best efficiency at large separations.

In near field RFID applications, however, it is not sufficient to only optimize for maximum WPT. Another consideration is ensuring that the system bandwidth is sufficient to support the transfer of data between reader and the tag. The conventional view of near-field RFID systems places a limit on the maximum Q-factor of the reader antenna of about 10-20. Higher Q-resonators have smaller bandwidth since the Q-factor is related to the bandwidth by $Q=f_c/\Delta f$, where $f_c$ is the center frequency, and $\Delta f$ is the bandwidth. Thus, the Q-factor cannot be increased indefinitely without making the system such an effective filter such that the transmission coefficient (we use S-parameters in this work, and thus the transmission coefficient is $S_{21}$) rejects all frequencies outside of a very small band around the center frequency.

On the other hand, as the next subsection will show, coils with larger Q-factors can provide more power at longer distances than coils with low Q. What follows will address how higher Q coils can be used to increase the power received by the tag without sacrificing bandwidth.

In this work, impedance matching is implemented in one of two regimes: either the input of the system (Port 1) is critically coupled (CC) to the source at 13.56 MHz, or Port 1 is overcoupled (OC) to the source at 13.56 MHz. It is the latter OC case that will be shown to be beneficial in increasing nearfield RFID read range. This is in contrast to the traditional CC case of the last subsection. FIG. 11 shows a typical smith chart plot illustrating how the impedances of the OC and CC cases vary with frequency. Note the CC case has zero reflection coefficient at resonance, but the OC case has a nonzero reflection coefficient in the same frequency range.

As alluded to, WPT is increased for coils with higher Q since the figure of merit for maximum power transfer of a system is proportional to $k^2 Q_1 Q_2$ where $Q_1$ and $Q_2$ are the quality factors of the transmitter and the receiver coils, respectively. While higher Q does increase WPT, it is simultaneously necessary to ensure that the bandwidth of the system is sufficient to support communication. To boost WPT while meeting bandwidth constraints, this work proposes using a reader coil with higher Q-factor that is over-coupled to the source. This is because over-coupling damps the resonance of the high Q resonator, thus broadening bandwidth, but not to such a degree that WPT efficiency is sacrificed. The next subsection will elaborate on this via an example.

To enable quantitative comparison, this work uses a parameter to distinguish between over-coupled (OC) and critically coupled (CC) circuits. This will be especially relevant in later experimental sections. Thus, an "overcoupling coefficient", g, will be used: $g=Q/Q_e$, where Q is the unloaded quality factor of the RLC tank, and $Q_e$, is the external quality factor of the resonator ($R \rightarrow R_s$). Defining g this way yields 3 cases: 1) g<1, for the under-coupled case, 2) g=1, for the CC case, and 3) g>1 for the OC case.

Here, an example of increasing read range via OC high Q coils is lastly introduced. FIG. 3 shows the calculated WPT efficiency to the load ($R_L$=1000, $C_L$=17 pF; this approximates a commercial tag) for the circuit of FIG. 10 at the center frequency $f_c$=13.56 MHz for three cases: a CC transmitter with Q=10, a CC resonator with Q=125, and an OC resonator with Q=125. The results are for reader to tag coil separations of 0 to 20 cm. These distances mirror those of the experimental data of later sections. Computation of k at each distance was done using a numerical algorithm that solves the field equations of a coupled coil system and generates mutual inductance via extraction of the coupled flux. Also shown is a black line indicating the minimum efficiency necessary to turn the tag on, assuming a 200 mW input, as in this work. All other circuit parameters for these three cases are shown in Table I. Note the choice of $C_1$ and $C_2$ are the mechanism by which OC or CC are achieved. It is clear that the transmitter coils with larger Q factor can meet the minimum required power threshold at greater distances than the low Q factor transmitter. Also important is that the OC and CC resonators meet this threshold at about the same transmitter to receiver separation. For OC resonators, this phenomenon appears often throughout the literature on WPT, and designs are often optimized using OC topologies.

TABLE I

READER PARAMETERS FOR SIMULATION

| Parameters | Low Q Tx, CC | High Q Tx, CC | High Q Tx, OC |
|---|---|---|---|
| $L_1$ | 1.5 µH | 1.5 µH | 1.5 µH |
| Q | 10 | 125 | 125 |
| $C_1$ | 51 pF | 13 pF | 23 pF |
| $C_2$ | 45 pF | 79 pF | 69 pF |
| OC coeff. (g) | 1.01 | 0.98 | 3.12 |

FIG. 12(a) shows that either the Q=125, CC or OC can increase read range if only considering power received by the tag. However, bandwidth must also be considered. FIG. 12(b) shows the bandwidth vs. separation for the same circuit and setup as in FIG. 12(a). This bandwidth is computed as the full width half maximum (FWHM) bandwidth of the transmission coefficient, $|S_{21}|$. The figure also shows the minimum required forward link bandwidth (load modulation bandwidth will be discussed later on) of 212 kHz (green line) for the tags used in this work, which are 14443 type A standard and have a bit rate of 106 kb/s. The low Q (Q=10) CC transmitter has the largest bandwidth at all distances, but it is much larger than what is necessary. The high Q resonators have similar bandwidths versus transmitter to receiver separation, but of the two, it is only the OC resonator that maintains sufficient bandwidth across all separations.

The reason for the above effect on system bandwidth can be seen in FIG. 13. Shown here is a plot of $|S_{21}|$ versus frequency for several example reader to tag coil separations. It can be seen that for the same separations, the over-coupled (OC) transmitter maintains a broader transmission spectrum than in the critically coupled (CC) case. This is due to the fact that OC the system effectively damps the resonance increasing the FWHM bandwidth; the system behaves effectively as one with lower quality factor. If it were not for the fact that the overcoupling of the source in isolation leads to a damped resonance, then, as seen in the CC case of FIG. 12(b), the read range would be limited to about 3.3 cm due to insufficient bandwidth at greater distances, even though the chip receives more power than required at these distances, FIG. 12(a). Thus, via this example it has been demonstrated how using higher Q coils can increase read range due to increased WPT, without limiting read range due to insufficient bandwidth.

The following analysis investigates the effects of using high Q-factor coils and over-coupling on the reverse link modulation (tag to the reader), the forward link data transmission (reader to tag) and the read range. First, it is discussed that the main limitation on increasing the Q-factor of the reader is the forward link budget. This restriction is relaxed by leveraging over-coupled tuning. Then, the key limitations imposed by reader and tag are combined to derive the read range as a function of over-coupling coefficient and Q-factor.

Figure 14:
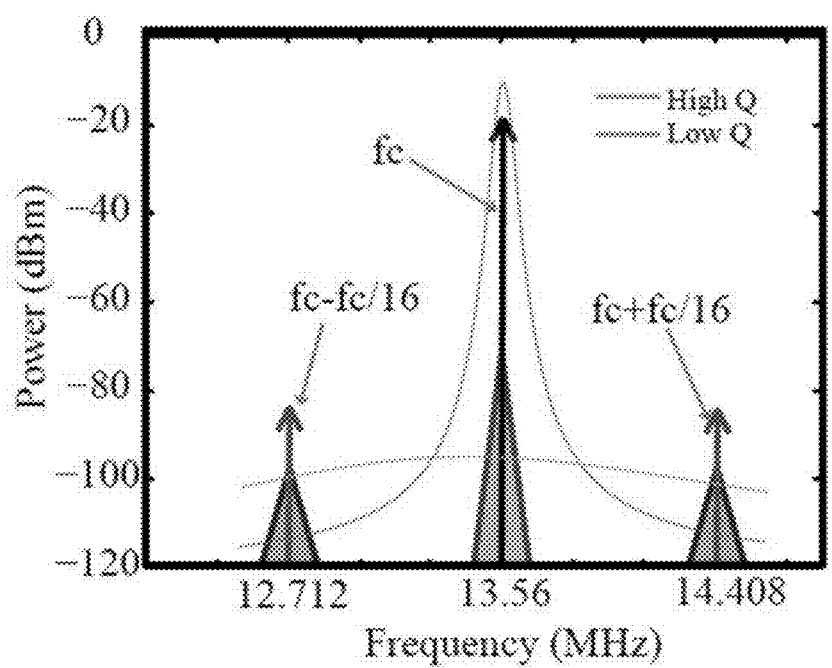
FIG. 14 shows a typical spectrum of an HF RFID system illustrating the reader command and the load modulation. The impact of increasing the reader Q-factor on the bandwidth and the load modulation is shown.

Typically, increasing the Q-factor results in narrower system bandwidth. To have a better understanding of this effect, a typical HF RFID spectrum is shown in FIG. 14. The reader command is carried in the sidebands of the carrier and the load modulation is carried in the sidebands of the two subcarriers shown in the blue triangles. The green line shows the magnitude of the scattering parameter ($|S_{21}|$) for a low Q reader and the pink line shows $|S_{21}|$ corresponding to a high Q-factor reader. It can be seen that with increasing Qfactor, bandwidth shrinks and the result is more attenuation at the subcarrier frequencies. In other words, if the received carrier power remains the same, the return signal will become smaller due to increased attenuation. This raises the concern that despite activating the tag, the return signal will be smaller than the reader sensitivity and the reader cannot decode the load modulation. To evaluate the impact of the bandwidth on the reverse link with more scrutiny, the return signal power must be computed based on the circuit model introduced in FIG. 10. First, the power delivered to the tag is calculated using $$P_d = P_{av} G_T(f_c) \quad (1)$$

where $G_T(f_c)$ and $P_{av}$ are the transducer gain (which is the same as actual received power) at the carrier frequency and the available power of the reader, respectively. $G_T$ is defined based on the Z-parameters of the circuit diagram in FIG. 10 as $$G_T = (4R_s R_L |Z_{21}|^2)(|Z_{11}+Z_S)(Z_{22}+Z_L) - Z_{21}Z_{12}|^2)^{-1} \quad (2)$$

where $Z_S$ and $Z_L$ are the impedance of source and load respectively, and $R_S$ and $R_L$ are their real parts. Second, the power of the signal modulated with the subcarrier is computed. The load modulation power is equal to $Pm=P_d m^2/4$. Finally, the modulated signal will return to the reader at the subcarrier frequency and the returned power received at the reader is equal to $$P_{bs} = P_m G_T(f_{sub}) \quad (3)$$

where $G_T(f_{sub})$ is the transducer gain at the subcarrier frequency. Equations (1)-(3) are used to calculate the return power from the load ($R_L=1000$, $C_L=17$ pF for a typical HF RFID chip) to the source ($R_s=50$) for the circuit of FIG. 10. The computed return signal is plotted in FIG. 15. The reader and the tag coils are tuned to resonate at the center frequency $f_c=13.56$ MHz. The Q-factor of the reader coils is varied from 10 to 300 while the Q-factor of the tag coil is fixed at 30. Then, the frequency is swept from 12 MHz to 15 MHz and the return signal power of the subcarrier frequency $f_{sub}=14:04$ MHz is computed from Eqs. (1)-(3) for a number of values of the overcoupling coefficient ($g=Q/Q_e$). It shows that for a given overcoupling coefficient by increasing Q-factor, the return signal power that reaches the reader increases. In other words, if the reader can detect and resolve the return signals for low Q-factor coils, it will be able to resolve the load modulation for higher Q-factor coils as well. Typically, the return signal can be detected if it lies above 110 dB below the level of the transmitter carrier signal. This figure also shows that by increasing the over-coupling coefficient of the reader coil, the return signal gets stronger due to the increased bandwidth and after a certain point by increasing the overcoupling coefficient, the return signal gets smaller which is due to increased input power reflection at the reader.

Figure 15:
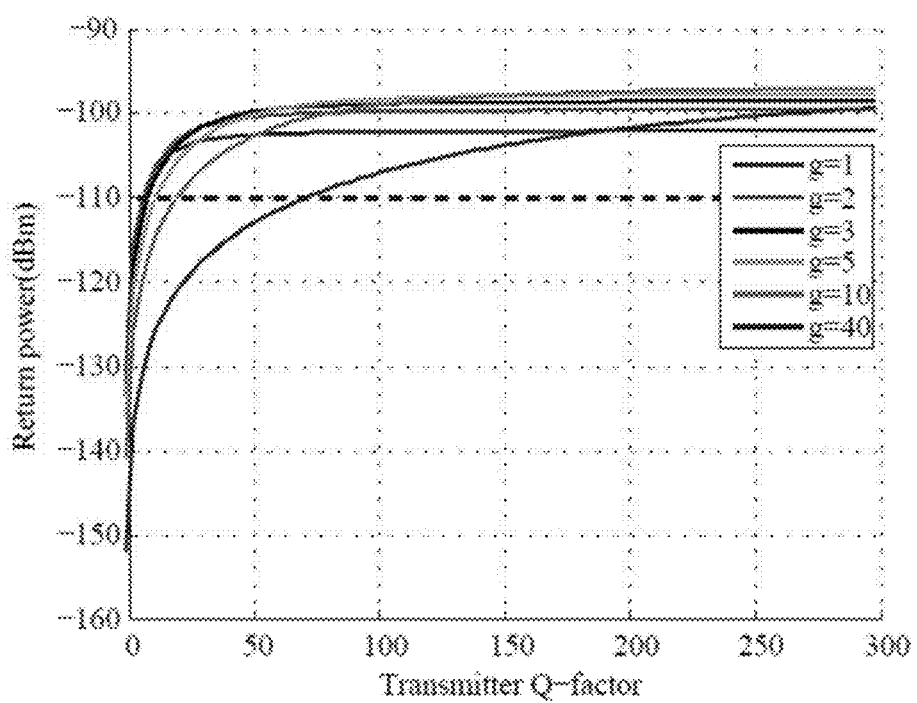
FIG. 15 shows the calculated return power vs. transmitter Q-factor for various overcoupling ratios (g), for $Q_{rx}$=20, and k=0:01). It shows that increasing the Q-factor increases the load modulation power that reaches the reader. The dashed line shows a typical value for the sensitivity of the reader chip.

Another important interpretation of FIG. 15 is that the bandwidth of high Q-factor HF RFID systems is not limited by the reverse link. In other words, the required bandwidth is defined mainly by the limitation on the forward link. Therefore, to find the Q-factor upper bound on the reader coil, the bandwidth required by the forward link must be taken into account.

It is necessary to understand the relationship between increasing Q-factor and the forward link bandwidth before discussing the impact of overcoupling on the bandwidth. As shown in FIG. 5, the link from the reader to the tag is a bandpass filter and the reader command is modulated at the center frequency of this filter, $f_c$. The 3 dB bandwidth of this filter decreases with increasing reader Q-factor. As long as, this 3 dB bandwidth covers the forward link data, shown in gray in FIG. 5, the tag will be able to decode the command, provided that the tag is turned on. In other words, the minimum bandwidth of the HF RFID system is equal to the bandwidth of the forward link.

Figure 16:
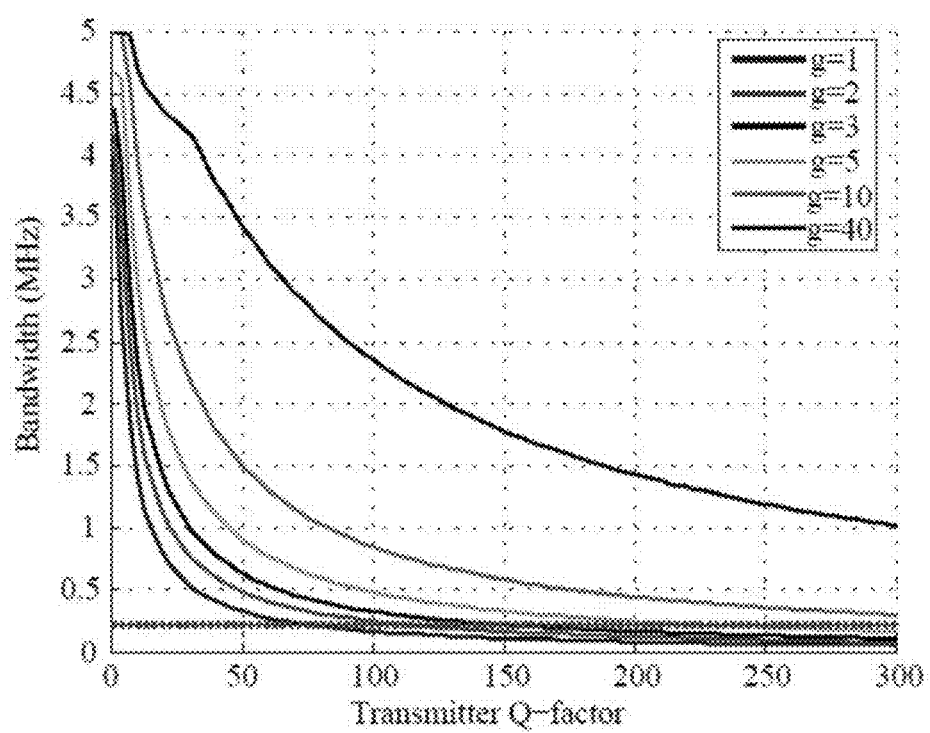
FIG. 16 shows the calculated bandwidth vs. reader Q-factor for various over-coupling coefficients (g) for $Q_{rx}$=20, and k=0:01. The grey dotted-line shows the minimum bandwidth required for a 14443 type A with 106 kb/s bit rate discussed earlier as an example. Over-coupled tuning increases the bandwidth and enables use of higher Q reader antennas.

The bandwidth of the forward link is the bandwidth of the modulation sidebands of the carrier and is dependent on the modulation scheme used by the reader. Typically, HF RFID readers use amplitude-shift keying (ASK) as the modulation scheme. The signal bandwidth for ASK modulation is estimated by $B=1/T_b$ where $T_b$ is the effective bit length. For instance, the bit length for 106 kb/s 14443 type A protocol is equal to a pulse width of up to 3 s and therefore the effective bandwidth is approximately 330 kHz. As described in the overview section, over-coupled readers enjoy higher bandwidth because over-coupling damps the resonance. FIG. 16 shows that the calculated bandwidth increases with over-coupling coefficient. The circuit model in FIG. 10 is tuned for a number of values of over-coupling coefficient at 13.56 MHz and the resultant bandwidth is calculated when the Q-factor of the reader is swept from 10 to 300; the reader is coupled to a typical RFID chip load as in Section II. C, for k=0:01. It is important to note that with increasing Q-factor, the reader must be more over-coupled to the source in order to provide enough bandwidth for the forward link. In other words, for higher Q-factor readers, the distance between the reader and the tag must be decreased to have enough bandwidth. This is an important insight because it shows the effect of the bandwidth on the range of the RFID reader. In the next subsection, we will combine this effect with the minimum power for activation of the tag to calculate read range.

The tag read range is the most prominent performance characteristic of an RFID system. The read range is dependent on many parameters, mainly, the sensitivity of the tag, the bandwidth of the system and the sensitivity of the reader. Generally, the read range is not limited by the reader sensitivity for RFID systems [21]. This leads to two conditions based on the tag sensitivity and the bandwidth as follows $$P_d = P_{av} G_T(f_c) \geq P_{th} \quad (4)$$

$$BW \geq 1/T_b \quad (5)$$

Where $P_{th}$ is the tag sensitivity and is defined as the minimum received power at the tag to activate the RFID chip. As discussed earlier, $T_b$ is the effective bit length. The circuit model in FIG. 10 is simulated for a typical HF RFID chip load ($R_L$=1000, $C_L$=17 pF) over a wide range of values for the Q-factor of the transmitter, over-coupling coefficient (g) and distance (i.e. the coupling factor, k). For each set of values for QTx, g, and d, the Z-parameter of the circuit is calculated and then the delivered power to the tag is computed using Eq. (1) and eq. (2) and then the conditions of Eq. (4) and (5) are checked to be true for $P_{th}$=−7 dBm (a typical RFID chip sensitivity) and minimum bandwidth of 300 kHz (this is an example for 106 kb/s, as in 14443 type A tags). Then the maximum reading distance ($d_{max}$) is extracted for each pair of (QTx, g), and the resulting surface is plotted in FIG. 17.

Figure 17:
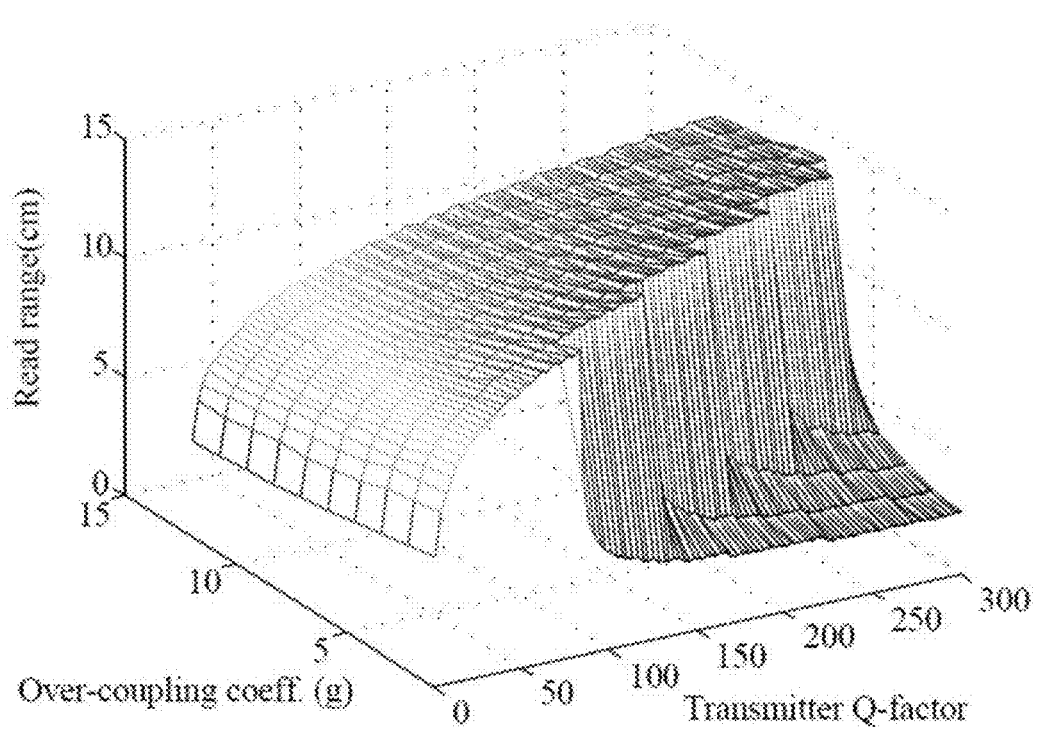
FIG. 17 shows the maximum reading distance vs. Q-factor of transmitter for varied over-coupling coefficients (g).
Figure 18A:
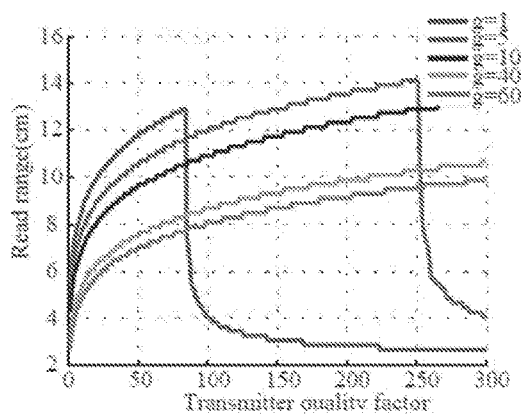
FIG. 18($a$) shows the impact of increasing Q-factor for given values of g.
Figure 18B:
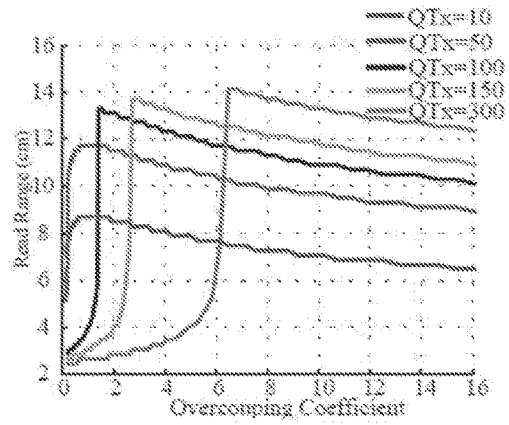

From FIG. 17, it can be seen that for a given over-coupling coefficient, e.g. g=1, the read range increases as the Q-factor increases up to the point where the bandwidth becomes smaller than the minimum required bandwidth of the forward link [Eq. (5)], the point where read range starts shrinking with increasing the Q-factor. At this point, by increasing the over-coupling of the reader to the source, the Q-factor increment still can lead to read range improvement. To observe this effect clearly, the read range is depicted vs. Q-factor of the transmitter for different values of g in FIG. 18(a). The read range vs. over-coupling coefficient for different transmitter Q-factors is shown in FIG. 18(b). It shows that for a certain Q-factor of reader, there is a minimum value of over-coupling coefficient, $g_{min}$, to ensure enough bandwidth for the forward link is provided. However, for overcoupling coefficients larger than $g_{min}$, due to increased power lost to reflections at the input port, the read range decreases.

Figure 19:
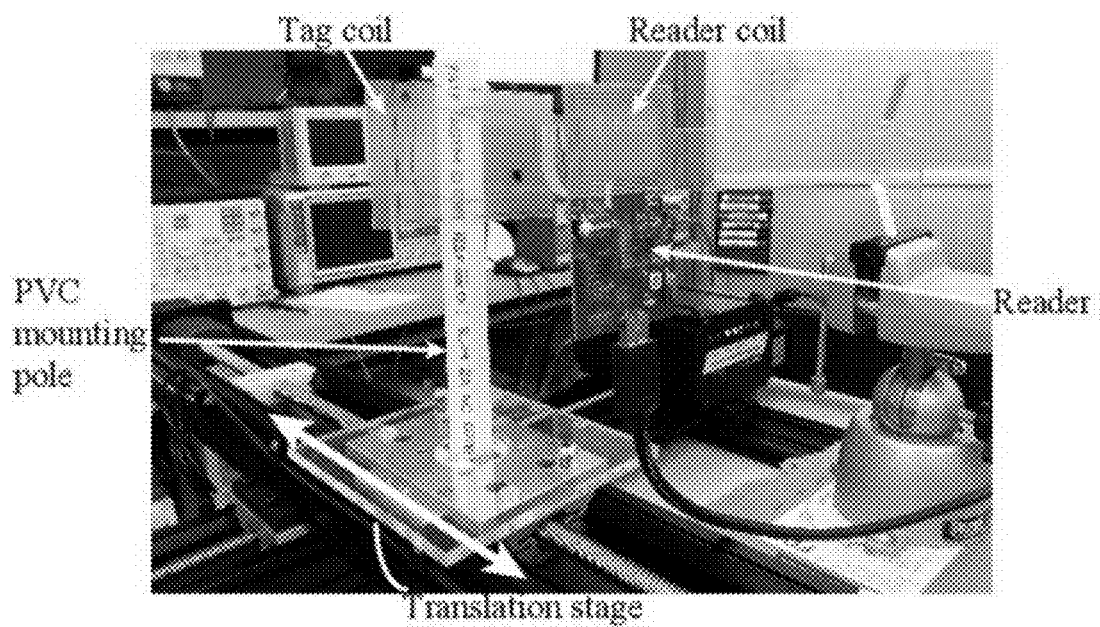
FIG. 19 shows a photograph of the experimental setup for measuring the read range. The RFID reader is a TRF7070 development kit.

FIG. 19 shows the experimental setup used to validate the effectiveness of over-coupling for high-Q coils in improving the read range. In this work, TRF797A development kit is used as the RFID reader. The reader consists of a 4-turn 55 mm 39 mm printed circuit rectangular coil with trace width of 1.3 mm and spacing of 0.5 mm. The inductance and selfresistance of the reader coil are 1.5 μH and 1 ohm as measured by a vector network analyzer (VNA). The reader position is fixed while the tag is mounted on a plastic pole on a positioning stage with an accuracy of 0.076 mm.

The tuning circuit shown in FIG. 20 (a) is implemented on the TRF7970a board using the parameter values of Table I for three cases: a CC with Q=10, a CC with Q=125, and OC with Q=125. To bring the Q-factor of the reader down to Q=10 for first case, TRF7970A stock configuration uses a resistor parallel to the reader coil, $R_d$=1.2 k-ohms. This resistor is removed from the board for the high-Q cases. All readers are tuned to resonate at $f_c$=13.56 MHz. FIG. 20(b) shows the measured reflection coefficient ($S_{11}$) when looking into Port 1 when the reader is in isolation (i.e. no reader to tag coupling.)

The designed readers are tested by 9 off-the-shelf commercial proximity and vicinity tags. 14443 and 15693 standard tags are used in this work as they are the most common tags used in HF RFID applications. The measured read ranges for all of the tags are summarised in Table II. The read range is increased by using High-Q over-coupling tuning technique for all the cases. The read range is improved from 18% to 81% for these tags. The reason for the variation of the improvement percentage is that the readers are not designed for a specific tag. Note that the read range is dependent on the Q-factor and also the size of the tags. The Q-factor of these tags are typically low and the size of tag coils and number of turns are generally determined by the application form-factor restriction as well as RFID chip parasitic capacitance. In addition, the loaded Q-factor of the tags are normally less than 10 due to the loading effect of the RFID chip (assuming $R_L$=1 k-ohms). To better represent the tag Q-factors, the unloaded Q-factor of the tags are measured by magnetically coupling into the tags. The results show that with increasing the Q-factor of the tag, the read range increases for all the readers. To show the power of the over-coupled tuning for high Q coils, in the next section, the over-coupled impedance matching method is used on a high Q tag coil as well as on the reader coil.

TABLE II

READ RANGE OF ANTENNAS USING COMMERCIAL TAGS

| Standard | MFG PN | Bit rate | Tag coil size | Unloaded Q-tag | LQ-CC | HQ-CC | HQ-OC |
|---|---|---|---|---|---|---|---|
| 14443A | NA | 106 kbp/s | 7 × 4.1 cm | 53 | 9.3 cm | 10.6 cm | 11.6 cm (+24%) |
| 14443A | NA | 106 kbp/s | 7.2 × 3.9 cm | 32 | 7.2 cm | 7.8 cm | 8.6 cm (+19%) |
| 14443A | NA | 106 kbp/s | 6.5 × 2.4 cm | 23 | 4.4 cm | 7.1 cm | 7.8 cm (+77%) |
| 14443A | MN63Y3212N4 | 106 kbp/s | 3 × 3 cm | 30 | 4 cm | 6 cm | 7 cm (+75%) |
| 14443A | MIKROE-1475 | 106 kbp/s | 2 × 2 cm | 28 | 4.8 cm | 6.8 cm | 8 cm (+66%) |
| 14443A | MF0MOA4U10 | 106 kbp/s | 7 × 4.1 cm | 53 | 4.8 cm | 7.2 cm | 8.7 cm (+81%) |
| 15693 | RI-I02-114B-01 | 1.66 kbp/s | 7.6 × 4.5 cm | 38 | 11.3 cm | 13.8 cm | 15.2 cm (+34%) |
| 15693 | RI-I11-114A-01 | 1.66 kbp/s | 4.5 × 4.5 cm | 33 | 10 cm | 11.8 cm | 13.2 cm (+32%) |
| 15693 | RI-I03-114A-01 | 1.66 kbp/s | 3.8 × 2.25 cm | 28 | 7.2 cm | 8.8 cm | 9.9 cm (+37%) |

To increase the read range farther, it is desirable to implement a tuning circuit before the RFID chip thereby also tuning the tag coil to operate in the over-coupled regime. To apply over-coupled tuning method for the tag coil, a printed circuit 6-turn spiral coil with outer diameter of 39 mm, inside diameter of 16 mm, and trace width of 1.3 mm with 1 mm spacing between the traces is fabricated on FR4 material. FIG. 21 (b) shows the designed tag coil with an SMA connector on it. For the read range measurement, a 14443 type A chip is soldered to an SMA connector and is mounted on the tag coil.

FIG. 21 (a) shows the diagram of the tuning circuit used to over-couple the tag coil. The way that the tuning circuit works is by reducing the voltage drop across the load using a capacitive voltage divider. If the impedances of the capacitors, $C_3$ and $C_4+C_L$, are less than $R_L$ at the resonance frequency, the ratio between the voltage across the tag coil and the load, $n=V_L/V_{coil}$, will be $$n = C_3(C_3+C_4+C_L)^{-1} \quad (6)$$

Normally, capacitors have very high Q-factors on the order of 1000 at NFC operating frequency, i.e. 13.56 MHz, and can be considered to be lossless. Therefore, the capacitive voltage divider simplifies to a voltage transformer. The capacitors can be used to create resonance with the coil inductance at $f_c=13.56$ MHz by using $$f_c = (2\pi(L_2 C_3(C_4+C_L)(C_3+C_4+C_L)^{-1})^{0.5})^{-1} \quad (7)$$

In this case, the impedance seen through port 2 will then be equal to $$R_{in} = n^2(1+Q_2^2)R_{p2} \quad (8)$$

where $Q_2$ is the Q-factor of the coil. At resonance, the overcoupling coefficient g reduces to $g=R_L/R_{in}$ and is thus a function of the ratio n. By decreasing n, $R_{in}$ decreases and the coil is more over-coupled to the load (i.e. g increases). The spiral coil tag shown in FIG. 21 (b) was tuned for 4 different over-coupling ratios, g, by varying n from 0.3 to 1 (from critically coupled, g=1, to highly over-coupled, g=10). The read range is reported in Table III. The fourth column of this table shows that even for Low Q (LQ), CC transmitters, the read range is extended when the tag g~2-3. Thus, overcoupling the tag has benefits itself. However, looking at the last column, which is for high Q (HQ) OC reader coils, the benefits are even more dramatic than using an OC tag alone where read range is improved by up to 88%. This improvement is between the conventional near field tuning approach (shown in fourth column, second row, where the value is 6) where no tuning is done on the tag and the reader is a low Q, CC coil, and the case where both the tag and reader are over-coupled to a near optimal degree (this case is also shown in the last column, third row, where the value is 11.3). For those cases in Table III with two values, the reader is not able to read the tag at distances closer than the smaller of the two values due to the frequency splitting effect, and cannot read at distances farther than the large of the two values due to insufficient power transfer.

Figure 22:
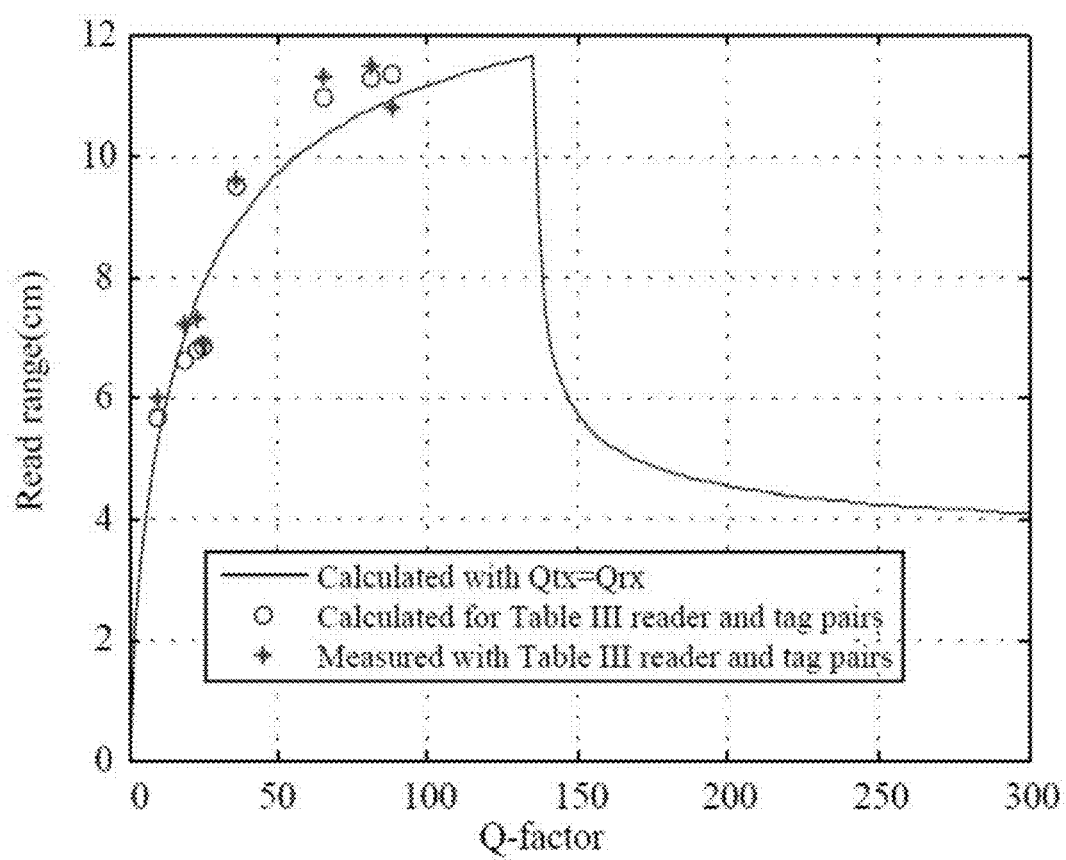
FIG. 22 shows maximum reading distance versus quality factor. For $Q_{tx} \neq Q_{rx}$, Q is defined as the geometric mean of $Q_{tx}$ and $Q_{rx}$. Measurement is the actual reading range using TRF7970A development kit.

The asterisks in FIG. 22 show the measured read range in Table III, plotted together with the calculated read range, circles, using the model presented above. The blue line shows the read range estimate for the case when the reader and the tag coils have the same Q-factors, as Q-factor varies from 1 to 300. FIG. 22 shows a good agreement between the measured and calculated read range, illustrating the utility of the model to predict the read range and aid in optimizing NFC RFID systems.

TABLE III

READ RANGE FOR VARIED η OF TAG Z-MATCHING CIRCUIT

| η | g | Tag $Q_{loaded}$ | LQ-CC Tx (cm) | HQ-CC Tx (cm) | HQ-OC Tx (cm) |
|---|---|---|---|---|---|
| 0.99 | 10 | 11 | 6 | 6.5 | 9.6 |
| 0.5 | 2.9 | 36 | 7.2 | 1.6-9.4 | 11.3 |
| 0.4 | 1.8 | 55 | 7.3 | 2.2-9.9 | 1.9-11.5 |
| 0.3 | 1 | 65 | 6.9 | 2.8-9.4 | 2.1-10.8 |

This work has shown how to achieve increased read range and increased read reliability in near field RFID systems via the introduction of high Q coils that extend the distances over which the tag receives adequate power to turn on, while overcoupling is used to maintain sufficient system bandwidth. This OC topology has been contrasted with traditional impedance matching strategies in near-field RFID where standard practices require critically coupling the source to the input.

Additionally, it has been shown experimentally and theoretically how the Q factor of transmitter antennas need not be strictly limited to values of 10-20, but that by leveraging the overcoupled tuning technique, higher Q coils can be successfully used. The results presented here show that high Q OC reader antennas can outperform low Q, CC antennas by almost a factor of 2 in some instances. Even when comparing high Q coils with critical coupling to high Q coils in the overcoupled regime, the improvements are considerable. The focus of this work has been on 106 kb/s 14443A, and 15693 standard RFID tags. Note that much more significant improvements are achievable for higher bit-rates where restrictions on Q-factor are tighter. This strategy of over-coupling is straightforward and can be implemented quite easily into many existing near field RFID systems, and so the benefits of this approach can be immediately reaped without extensive system re-engineering, ultimately leading to systems with increased range and reliability that is noticeable to a real world user.

It is believed that no readers or tags have impedance matching networks as described herein. Many have no impedance matching networks, while it is possible (but not known) that some readers may have very simple impedance networks (perhaps including only $R_1$ and $C_1$). In such case, such case, it may be the sophistication of the impedance matching networks shown herein that helps to provide the novel and improved results. Further, it may be the operation in the over-coupled regime that helps to provide the novel and improved results.

It is also worth noting that all of the top NFC RFID reader IC manufacturers (e.g., Texas Instruments, NXP/Philips, ST Microelectronics, and so forth) provide reference designs and application notes that state that the reader antenna Q-factor must be between 10 and 20 in order to meet the bandwidth specifications for the ISO-15693 and ISO-14443 protocols. Further, they state that the input impedance of the antenna should be 50 ohms when the antenna is in isolation. These two conditions limit the antenna design to low-Q coils which are under-coupled. Further, since traditional RFID antennas are limited to the under-coupled regime, the only way they can generate enough flux density to power the RFID tags with small antennas is to create secondary (or nested) antennas, which sacrifice overall system performance. Thus, the leading technology companies in this field have clearly and specifically taught away from using antennas with Q-factors greater than 20 and from using over-coupled designs. Further, testing has shown that with the high Q-factors and over-coupled designs taught herein, the bandwidth requirements of the above-referenced specifications are met, despite statements and implications to the contrary by the industry leaders. All of this helps to establish the non-obvious nature of the teachings herein.

Of course, while the discussion herein has related to the use of improved RFID technology for unlocking door locks, it should be understood that the improved RFID technology can be similarly applied to any other RFID application. Without limitation, these could include RFID applications where RFID readers or tags are embedded in wrist-worn devices (e.g., smart watches), hand-held devices (e.g., smart phones), laptops, other mobile communication devices, or any other suitable device.

It should be understood that the teachings herein of high-Q readers and tags, over-coupled reader/tag combinations, impedance matching, and so forth, all apply to transmission of data signals only, transmission of power signals only, and transmission of any electrical signals (including data signals and power signals).

Loaded quality factor refers to the quality factor of the coil when the RFID Integrated Circuit is attached. Unloaded quality factor refers to the quality factor of the coil when the RFID Integrated Circuit is not attached. Herein, we may typically be referring to the unloaded quality factor. For instance, the RFID reader with an output impedance of 50 ohms may be attached to the RFID coil plus the impedance matching network.

NFC tags contain data and are typically read-only, but may be rewriteable. They can be custom-encoded by their manufacturers or use the specifications provided by the NFC Forum, an industry association charged with promoting the technology and setting key standards. The tags can securely store personal data such as debit and credit card information, loyalty program data, PINs and networking contacts, among other information. RFID readers transmit data to the tag via amplitude modulation. Tags transmits data back to the reader via load modulation. For example, the reader transmits a continuous constant amplitude single and the tag changes its load (between high and low). The change in load can be sensed by the reader to encode data.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

I claim:

1. An RFID system, comprising:
   a tag including a tag antenna and a first integrated circuit coupled together that selectively transfers a data signal; and
   a reader including a reader antenna and a second integrated circuit coupled together that in combination receives the data signal from the tag;
   wherein at least one of the tag antenna and the reader antenna have a Q-factor that is greater than 30;
   wherein the reader antenna and the second integrated circuit are sufficiently matched in impedance to over-couple the reader antenna and the second integrated circuit to each other.

2. An RFID system as defined in claim 1, wherein the tag is worn by a user.

3. An RFID system as defined in claim 1, wherein the tag is attached to a wristband worn by a user.

4. An RFID system as defined in claim 1, wherein the reader is attached to a door having a door lock mechanism and provides an unlock signal to the door lock mechanism.

5. An RFID system as defined in claim 1, wherein the tag is attached to a wristband worn by a user and the reader is attached to a door having a door lock mechanism and provides an unlock signal to the door lock mechanism.

6. An RFID system as defined in claim 5, wherein the door pivots about a door pivot axis and the door includes a planar door surface and a door latch actuator that pivots about an actuator pivot axis, the door latch actuator including an elongated handle portion defining a handle axis that extends transversely from the actuator pivot axis and parallel to the planar door surface, the reader being located in relation to the planar door surface in a position vertically offset from and spaced apart from the handle axis and horizontally offset from and spaced apart from the actuator pivot axis in a direction toward the pivot axis.

7. An RFID system as defined in claim 1, wherein the reader antenna includes an impedance matching network associated therewith.

8. An RFID system as defined in claim 7, wherein the tag antenna includes an impedance matching network associated therewith.

9. An RFID system as defined in claim 1, wherein the tag antenna includes an impedance matching network associated therewith.

10. An RFID system as defined in claim 1, wherein the data signal includes a tag identifier.

11. An RFID system as defined in claim 10, wherein the tag identifier includes an identification number.

* * * * *